United States Patent
Konishi et al.

(10) Patent No.: US 8,152,377 B2
(45) Date of Patent: *Apr. 10, 2012

(54) LOW-FRICTION SLIDING MECHANISM

(75) Inventors: Shozaburo Konishi, Yokohama (JP);
Makoto Kano, Yokohama (JP);
Yoshiteru Yasuda, Yokohama (JP);
Yutaka Mabuchi, Yokohama (JP);
Takahiro Hamada, Yokohama (JP);
Shigeki Takeshima, Yokohama (JP);
Kenji Tsushima, Yokohama (JP)

(73) Assignees: Nissan Motor Co., Ltd., Kanagawa (JP);
Nippon Oil Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/835,705

(22) Filed: Jul. 13, 2010

(65) Prior Publication Data

US 2011/0028361 A1 Feb. 3, 2011

Related U.S. Application Data

(60) Continuation of application No. 11/955,949, filed on Dec. 13, 2007, now abandoned, which is a continuation of application No. 11/123,016, filed on May 6, 2005, now Pat. No. 7,322,749, which is a division of application No. 10/692,853, filed on Oct. 27, 2003, now Pat. No. 6,969,198.

(30) Foreign Application Priority Data

Nov. 6, 2002 (JP) ................................. 2002-322322
Aug. 11, 2003 (JP) ................................. 2003-207056
Aug. 21, 2003 (JP) ................................. 2003-208193

(51) Int. Cl.
*F16C 17/00* (2006.01)

(52) U.S. Cl. ............ 384/13; 384/42; 384/129; 384/297; 384/322; 384/907.1

(58) Field of Classification Search ................... 384/13, 384/42, 129, 297, 322, 907.1
See application file for complete search history.

(56) References Cited

U.S. PATENT DOCUMENTS

| 1,461 A | 12/1839 | Day |
| 2,716,972 A | 9/1955 | Farny et al. |

(Continued)

FOREIGN PATENT DOCUMENTS

| CA | 2009582 | 8/1990 |

(Continued)

OTHER PUBLICATIONS

Gåhlin, Rickard et al., "ME-C:H Coatings in Motor Vehicles," *Wear* 249, 2001, pp. 302-309.

(Continued)

*Primary Examiner* — Thomas R Hannon
(74) *Attorney, Agent, or Firm* — Foley & Lardner LLP

(57) ABSTRACT

A low-friction sliding mechanism includes first and second sliding members having respective sliding surfaces slidable relative to each other and a lubricant applied to the sliding surfaces of the first and second sliding members. At least the sliding surface of the first sliding member is made of a diamond-like carbon material, and at least the sliding surface of the second sliding member is made of either an aluminum-based alloy material, a magnesium-based alloy material or a diamond-like carbon material. The lubricant contains a base oil and at least one of an ashless fatty-ester friction modifier and an ashless aliphatic-amine friction modifier.

13 Claims, 1 Drawing Sheet

U.S. PATENT DOCUMENTS

| | | |
|---|---|---|
| 2,982,733 A | 5/1961 | Wright et al. |
| 3,211,647 A | 10/1965 | O'Halloran et al. |
| 3,790,315 A | 2/1974 | Emanuelsson et al. |
| 3,846,162 A | 11/1974 | Bloom |
| 3,932,228 A | 1/1976 | Sugiyama et al. |
| 4,031,023 A | 6/1977 | Musser et al. |
| 4,367,130 A | 1/1983 | Lemelson |
| 4,385,880 A | 5/1983 | Lemelson |
| 4,538,929 A | 9/1985 | Ehrentraut et al. |
| 4,554,208 A | 11/1985 | MacIver et al. |
| 4,645,610 A | 2/1987 | Born et al. |
| 4,702,808 A | 10/1987 | Lemelson |
| 4,712,982 A | 12/1987 | Inagaki et al. |
| 4,755,237 A | 7/1988 | Lemelson |
| 4,755,426 A | 7/1988 | Kokai et al. |
| 4,783,368 A | 11/1988 | Yamamoto et al. |
| 4,834,400 A | 5/1989 | Lebeck |
| 4,842,755 A | 6/1989 | Dunn |
| 4,859,493 A | 8/1989 | Lemelson |
| 4,874,596 A | 10/1989 | Lemelson |
| 4,919,974 A | 4/1990 | McCune et al. |
| 4,933,058 A | 6/1990 | Bache et al. |
| 4,943,345 A | 7/1990 | Asmussen et al. |
| 4,960,643 A | 10/1990 | Lemelson |
| 4,974,498 A | 12/1990 | Lemelson |
| 4,980,021 A | 12/1990 | Kitamura et al. |
| 4,980,610 A | 12/1990 | Varga |
| 4,981,717 A | 1/1991 | Thaler |
| 4,988,421 A | 1/1991 | Drawl et al. |
| 4,992,082 A | 2/1991 | Drawl et al. |
| 5,000,541 A | 3/1991 | DiMarcello et al. |
| 5,021,628 A | 6/1991 | Lemelson |
| 5,032,243 A | 7/1991 | Bache et al. |
| 5,036,211 A | 7/1991 | Scott |
| 5,040,501 A | 8/1991 | Lemelson |
| 5,067,826 A | 11/1991 | Lemelson |
| 5,077,990 A | 1/1992 | Plath |
| 5,078,848 A | 1/1992 | Anttila et al. |
| 5,087,608 A | 2/1992 | Chan et al. |
| 5,096,352 A | 3/1992 | Lemelson |
| 5,110,435 A | 5/1992 | Haberland |
| 5,112,025 A | 5/1992 | Nakayama et al. |
| 5,127,314 A | 7/1992 | Swain |
| 5,131,941 A | 7/1992 | Lemelson |
| 5,132,587 A | 7/1992 | Lemelson |
| 5,142,785 A | 9/1992 | Grewal et al. |
| 5,143,634 A | 9/1992 | Quinga et al. |
| 5,148,780 A | 9/1992 | Urano et al. |
| 5,187,021 A | 2/1993 | Vydra et al. |
| 5,190,807 A | 3/1993 | Kimock et al. |
| 5,190,824 A | 3/1993 | Itoh |
| 5,202,156 A | 4/1993 | Yamamoto et al. |
| 5,205,188 A | 4/1993 | Repenning et al. |
| 5,205,305 A | 4/1993 | Yamakita |
| H1210 H | 7/1993 | Jansen |
| 5,232,568 A | 8/1993 | Parent et al. |
| 5,237,967 A | 8/1993 | Willermet et al. |
| 5,249,554 A | 10/1993 | Tamor et al. |
| 5,255,783 A | 10/1993 | Goodman et al. |
| 5,255,929 A | 10/1993 | Lemelson |
| 5,284,394 A | 2/1994 | Lemelson |
| 5,288,556 A | 2/1994 | Lemelson |
| 5,295,305 A | 3/1994 | Hahn et al. |
| 5,299,937 A | 4/1994 | Gow |
| 5,317,938 A | 6/1994 | de Juan, Jr. et al. |
| 5,326,488 A | 7/1994 | Minokami et al. |
| 5,332,348 A | 7/1994 | Lemelson |
| 5,334,306 A | 8/1994 | Dautremont-Smith et al. |
| 5,349,265 A | 9/1994 | Lemelson |
| 5,358,402 A | 10/1994 | Reed et al. |
| 5,359,170 A | 10/1994 | Chen et al. |
| 5,360,227 A | 11/1994 | Lemelson |
| 5,380,196 A | 1/1995 | Kelly et al. |
| 5,401,543 A | 3/1995 | O'Neill et al. |
| H1461 H | 7/1995 | DiVita et al. |
| 5,432,539 A | 7/1995 | Anderson |
| 5,433,977 A | 7/1995 | Sarin et al. |
| H1471 H | 8/1995 | Braun et al. |
| 5,443,032 A | 8/1995 | Vichr et al. |
| 5,447,208 A | 9/1995 | Lund et al. |
| 5,456,406 A | 10/1995 | Lemelson |
| 5,458,754 A | 10/1995 | Sathrum et al. |
| 5,461,648 A | 10/1995 | Nauflett et al. |
| 5,462,772 A | 10/1995 | Lemelson |
| 5,464,667 A | 11/1995 | Köhler et al. |
| 5,466,431 A | 11/1995 | Dorfman et al. |
| 5,479,069 A | 12/1995 | Winsor |
| 5,482,602 A | 1/1996 | Cooper et al. |
| 5,491,028 A | 2/1996 | Sarin et al. |
| 5,497,550 A | 3/1996 | Trotta et al. |
| 5,509,841 A | 4/1996 | Winsor |
| 5,516,729 A | 5/1996 | Dawson et al. |
| 5,529,815 A | 6/1996 | Lemelson |
| 5,531,878 A | 7/1996 | Vadgama et al. |
| 5,541,566 A | 7/1996 | Deeney |
| 5,547,716 A | 8/1996 | Thaler |
| 5,551,959 A | 9/1996 | Martin et al. |
| 5,552,675 A | 9/1996 | Lemelson |
| 5,568,391 A | 10/1996 | Mckee |
| 5,593,719 A | 1/1997 | Dearnaley et al. |
| 5,616,372 A | 4/1997 | Conley et al. |
| 5,619,889 A | 4/1997 | Jones et al. |
| 5,628,881 A | 5/1997 | Lemelson |
| 5,630,275 A | 5/1997 | Wexler |
| 5,630,953 A | 5/1997 | Klink |
| 5,653,300 A | 8/1997 | Lund et al. |
| 5,669,144 A | 9/1997 | Hahn et al. |
| 5,672,054 A | 9/1997 | Cooper et al. |
| 5,688,557 A | 11/1997 | Lemelson et al. |
| 5,707,409 A | 1/1998 | Martin et al. |
| 5,714,202 A | 2/1998 | Lemelson et al. |
| 5,719,109 A | 2/1998 | Tokashiki et al. |
| 5,723,207 A | 3/1998 | Lettington et al. |
| 5,731,046 A | 3/1998 | Mistry et al. |
| 5,735,769 A | 4/1998 | Takemura et al. |
| 5,740,941 A | 4/1998 | Lemelson |
| 5,775,817 A | 7/1998 | Gottemoller et al. |
| 5,786,038 A | 7/1998 | Conley et al. |
| 5,790,146 A | 8/1998 | Anderson |
| 5,793,390 A | 8/1998 | Claflin et al. |
| 5,794,801 A | 8/1998 | Lemelson |
| 5,799,549 A | 9/1998 | Decker et al. |
| 5,806,557 A | 9/1998 | Helge |
| 5,824,387 A | 10/1998 | Boutaghou et al. |
| 5,834,708 A | 11/1998 | Svetal et al. |
| 5,840,662 A | 11/1998 | Nibert et al. |
| 5,843,571 A | 12/1998 | Sho |
| 5,851,962 A | 12/1998 | Kaga |
| 5,866,195 A | 2/1999 | Lemelson |
| 5,871,805 A | 2/1999 | Lemelson |
| 5,881,444 A | 3/1999 | Schaefer et al. |
| 5,901,021 A | 5/1999 | Hirano et al. |
| 5,910,940 A | 6/1999 | Guerra |
| 5,927,897 A | 7/1999 | Attar |
| 5,937,812 A | 8/1999 | Reedy et al. |
| 5,940,975 A | 8/1999 | Decker et al. |
| 5,945,214 A | 8/1999 | Ma et al. |
| 5,947,710 A | 9/1999 | Cooper et al. |
| 5,952,102 A | 9/1999 | Cutler |
| 5,958,261 A | 9/1999 | Offer et al. |
| 5,960,762 A | 10/1999 | Imai |
| 5,967,250 A | 10/1999 | Lund et al. |
| 5,968,596 A | 10/1999 | Ma et al. |
| 5,975,686 A | 11/1999 | Hauck et al. |
| 5,976,707 A | 11/1999 | Grab |
| 5,992,268 A | 11/1999 | Decker et al. |
| 5,993,938 A | 11/1999 | Tsukuda et al. |
| 6,006,415 A | 12/1999 | Schaefer et al. |
| 6,015,597 A | 1/2000 | David |
| 6,016,000 A | 1/2000 | Moslehi |
| 6,023,979 A | 2/2000 | Bills et al. |
| 6,028,393 A | 2/2000 | Izu et al. |
| 6,051,298 A | 4/2000 | Ko et al. |
| 6,056,443 A | 5/2000 | Koike et al. |
| 6,059,460 A | 5/2000 | Ono et al. |
| 6,059,830 A | 5/2000 | Lippincott, III et al. |
| 6,071,597 A | 6/2000 | Yang et al. |

| Patent | Kind | Date | Inventors |
|---|---|---|---|
| 6,083,313 | A | 7/2000 | Venkatraman et al. |
| 6,083,570 | A | 7/2000 | Lemelson et al. |
| 6,095,690 | A | 8/2000 | Niegel et al. |
| 6,099,541 | A | 8/2000 | Klopotek |
| 6,099,976 | A | 8/2000 | Lemelson et al. |
| 6,106,919 | A | 8/2000 | Lee et al. |
| 6,124,198 | A | 9/2000 | Moslehi |
| 6,139,964 | A | 10/2000 | Sathrum et al. |
| 6,142,481 | A | 11/2000 | Iwashita et al. |
| 6,145,608 | A | 11/2000 | Lund et al. |
| 6,156,439 | A | 12/2000 | Coffinberry |
| 6,159,558 | A | 12/2000 | Wolfe et al. |
| 6,160,683 | A | 12/2000 | Boutaghou |
| 6,165,616 | A | 12/2000 | Lemelson et al. |
| 6,170,156 | B1 | 1/2001 | Lev et al. |
| 6,171,343 | B1 | 1/2001 | Dearnaley et al. |
| 6,173,913 | B1 | 1/2001 | Shafer et al. |
| 6,190,514 | B1 | 2/2001 | Ma et al. |
| 6,193,906 | B1 | 2/2001 | Kaneko et al. |
| 6,197,120 | B1 | 3/2001 | David |
| 6,197,428 | B1 | 3/2001 | Rogers |
| 6,203,651 | B1 | 3/2001 | Järvenkylä et al. |
| 6,205,291 | B1 | 3/2001 | Hughes et al. |
| 6,207,625 | B1 | 3/2001 | Ogano et al. |
| 6,227,056 | B1 | 5/2001 | Bills et al. |
| 6,237,441 | B1 | 5/2001 | Nishioka et al. |
| 6,237,852 | B1 | 5/2001 | Svetal et al. |
| 6,238,839 | B1 | 5/2001 | Tomita et al. |
| 6,255,262 | B1 | 7/2001 | Keenan et al. |
| 6,261,424 | B1 | 7/2001 | Goncharenko et al. |
| 6,273,793 | B1 | 8/2001 | Liners et al. |
| 6,274,220 | B1 | 8/2001 | Tsukuda et al. |
| 6,289,593 | B1 | 9/2001 | Decker et al. |
| 6,293,648 | B1 | 9/2001 | Anderson |
| 6,296,552 | B1 | 10/2001 | Boutaghou et al. |
| 6,299,425 | B1 | 10/2001 | Hirano et al. |
| 6,305,416 | B1 | 10/2001 | Snel et al. |
| 6,309,283 | B1 | 10/2001 | Liners et al. |
| 6,311,524 | B1 | 11/2001 | Brennan, III et al. |
| 6,316,734 | B1 | 11/2001 | Yang |
| 6,322,431 | B1 | 11/2001 | Schaenzer et al. |
| 6,322,719 | B2 | 11/2001 | Kaneko et al. |
| 6,324,060 | B1 | 11/2001 | Hsu |
| 6,325,385 | B1 | 12/2001 | Iwashita et al. |
| 6,329,328 | B1 | 12/2001 | Koganei et al. |
| 6,333,298 | B1 | 12/2001 | Waddoups et al. |
| 6,338,881 | B1 | 1/2002 | Sellschopp et al. |
| 6,340,245 | B1 | 1/2002 | Horton et al. |
| 6,358,123 | B1 | 3/2002 | Liners et al. |
| 6,367,705 | B1 | 4/2002 | Lee et al. |
| 6,368,676 | B1 | 4/2002 | Gaudreau et al. |
| 6,377,422 | B1 | 4/2002 | Boutaghou et al. |
| 6,379,383 | B1 | 4/2002 | Palmaz et al. |
| 6,385,987 | B2 | 5/2002 | Schlom et al. |
| 6,386,468 | B1 | 5/2002 | Neuberger et al. |
| 6,399,215 | B1 | 6/2002 | Zhu et al. |
| 6,401,058 | B1 | 6/2002 | Akalin et al. |
| 6,439,845 | B1 | 8/2002 | Veres |
| 6,439,986 | B1 | 8/2002 | Myoung et al. |
| 6,452,752 | B1 | 9/2002 | Boutaghou |
| 6,468,642 | B1 | 10/2002 | Bray et al. |
| 6,471,979 | B2 | 10/2002 | New et al. |
| 6,494,881 | B1 | 12/2002 | Bales et al. |
| 6,523,456 | B1 | 2/2003 | Kobayashi et al. |
| 6,524,212 | B2 | 2/2003 | Ushijima et al. |
| 6,534,141 | B1 | 3/2003 | Hull, Jr. et al. |
| 6,537,310 | B1 | 3/2003 | Palmaz et al. |
| 6,537,429 | B2 | 3/2003 | O'Donnell et al. |
| 6,543,394 | B2 | 4/2003 | Tinney |
| 6,544,308 | B2 | 4/2003 | Griffin et al. |
| 6,553,957 | B1 | 4/2003 | Ishikawa et al. |
| 6,557,968 | B2 | 5/2003 | Lee et al. |
| 6,562,445 | B2 | 5/2003 | Iwamura |
| 6,562,462 | B2 | 5/2003 | Griffin et al. |
| 6,570,172 | B2 | 5/2003 | Kim et al. |
| 6,572,651 | B1 | 6/2003 | De Scheerder et al. |
| 6,572,935 | B1 | 6/2003 | He et al. |
| 6,572,937 | B2 | 6/2003 | Hakovirta et al. |
| 6,585,064 | B2 | 7/2003 | Griffin et al. |
| 6,586,069 | B2 | 7/2003 | Dykes et al. |
| 6,589,640 | B2 | 7/2003 | Griffin et al. |
| 6,592,519 | B1 | 7/2003 | Martinez |
| 6,592,985 | B2 | 7/2003 | Griffin et al. |
| 6,601,662 | B2 | 8/2003 | Matthias et al. |
| 6,626,949 | B1 | 9/2003 | Townley |
| 6,629,906 | B1 | 10/2003 | Chiba et al. |
| 6,637,528 | B2 | 10/2003 | Nishiyama et al. |
| 6,638,569 | B2 | 10/2003 | McLaughlin et al. |
| 6,645,354 | B1 | 11/2003 | Gorokhovsky |
| 6,656,329 | B1 | 12/2003 | Ma et al. |
| 6,658,941 | B1 | 12/2003 | Bills et al. |
| 6,666,328 | B2 | 12/2003 | Sykora |
| 6,666,671 | B1 | 12/2003 | Olver et al. |
| 6,684,513 | B1 | 2/2004 | Clipstone et al. |
| 6,684,759 | B1 | 2/2004 | Gorokhovsky |
| 6,695,865 | B2 | 2/2004 | Boyle et al. |
| 6,699,106 | B2 | 3/2004 | Myoung et al. |
| 6,701,627 | B2 | 3/2004 | Korb et al. |
| 6,715,693 | B1 | 4/2004 | Dam et al. |
| 6,726,993 | B2 | 4/2004 | Teer et al. |
| 6,729,350 | B2 | 5/2004 | Schick |
| 6,729,527 | B2 | 5/2004 | Sonnenreich et al. |
| 6,733,513 | B2 | 5/2004 | Boyle et al. |
| 6,739,214 | B2 | 5/2004 | Griffin et al. |
| 6,739,238 | B2 | 5/2004 | Ushijima et al. |
| 6,740,393 | B1 | 5/2004 | Massler et al. |
| 6,745,742 | B2 | 6/2004 | Meyer |
| 6,749,033 | B2 | 6/2004 | Griffin et al. |
| 6,753,042 | B1 | 6/2004 | Bakounine et al. |
| 6,753,635 | B2 | 6/2004 | Kuhlmann-Wilsdorf |
| 6,761,532 | B2 | 7/2004 | Capone et al. |
| 6,761,736 | B1 | 7/2004 | Woo et al. |
| 6,780,177 | B2 | 8/2004 | Shafirstein et al. |
| 6,797,326 | B2 | 9/2004 | Griffin et al. |
| 6,799,468 | B2 | 10/2004 | Borenstein |
| 6,806,242 | B2 | 10/2004 | Shirahama et al. |
| 6,818,029 | B2 | 11/2004 | Myoung et al. |
| 6,820,676 | B2 | 11/2004 | Palmaz et al. |
| 6,821,189 | B1 | 11/2004 | Coad et al. |
| 6,821,624 | B2 | 11/2004 | Utsumi et al. |
| 6,822,788 | B2 | 11/2004 | Blitstein |
| 6,844,068 | B1 | 1/2005 | Miyake et al. |
| 6,849,085 | B2 | 2/2005 | Marton |
| 6,855,237 | B2 | 2/2005 | Kolpakov et al. |
| 6,855,791 | B2 | 2/2005 | Van Doren et al. |
| 6,861,098 | B2 | 3/2005 | Griffin et al. |
| 6,861,137 | B2 | 3/2005 | Griffin et al. |
| 6,865,952 | B2 | 3/2005 | Bills et al. |
| 6,866,894 | B2 | 3/2005 | Trankiem et al. |
| 6,871,700 | B2 | 3/2005 | Gorokhovsky |
| 6,872,203 | B2 | 3/2005 | Shafirstein et al. |
| 6,878,447 | B2 | 4/2005 | Griffin et al. |
| 6,880,469 | B2 | 4/2005 | Frost |
| 6,882,094 | B2 | 4/2005 | Dimitrijevic et al. |
| 6,883,476 | B1 | 4/2005 | Nohara et al. |
| 6,885,521 | B2 | 4/2005 | Kikuchi |
| 6,886,521 | B2 | 5/2005 | Hamada et al. |
| 6,887,585 | B2 | 5/2005 | Herbst-Dederichs |
| 6,890,700 | B2 | 5/2005 | Tomita et al. |
| 6,893,720 | B1 | 5/2005 | Nakahigashi et al. |
| 6,969,198 | B2 * | 11/2005 | Konishi et al. ......... 384/13 |
| 7,322,749 | B2 * | 1/2008 | Konishi et al. ......... 384/13 |
| 2001/0036800 | A1 | 11/2001 | Liners et al. |
| 2002/0026899 | A1 | 3/2002 | McLaughlin et al. |
| 2002/0031987 | A1 | 3/2002 | Liners et al. |
| 2002/0034631 | A1 | 3/2002 | Griffin et al. |
| 2002/0034632 | A1 | 3/2002 | Griffin et al. |
| 2002/0051286 | A1 | 5/2002 | Blitstein |
| 2002/0070357 | A1 | 6/2002 | Kim et al. |
| 2002/0074168 | A1 | 6/2002 | Matthias et al. |
| 2002/0089571 | A1 | 7/2002 | Lee et al. |
| 2002/0090155 | A1 | 7/2002 | Ushijima et al. |
| 2002/0090578 | A1 | 7/2002 | Schaefera et al. |
| 2002/0130219 | A1 | 9/2002 | Parseghian et al. |
| 2002/0148430 | A1 | 10/2002 | Kano et al. |
| 2002/0155015 | A1 | 10/2002 | Esumi et al. |
| 2002/0175476 | A1 | 11/2002 | Chinou et al. |
| 2003/0012234 | A1 | 1/2003 | Watson et al. |

| | | | | | | |
|---|---|---|---|---|---|---|
| 2003/0019111 A1 | 1/2003 | Korb et al. | | EP | 0 435 312 | 7/1991 |
| 2003/0019332 A1 | 1/2003 | Korb et al. | | EP | 0474369 A1 | 3/1992 |
| 2003/0021995 A1 | 1/2003 | Griffin et al. | | EP | 0 500 253 | 8/1992 |
| 2003/0034182 A1 | 2/2003 | Griffin et al. | | EP | 0511153 A1 | 10/1992 |
| 2003/0035957 A1 | 2/2003 | Griffin et al. | | EP | 0 529 327 | 3/1993 |
| 2003/0035958 A1 | 2/2003 | Griffin et al. | | EP | 0392125 B1 | 3/1993 |
| 2003/0036341 A1 | 2/2003 | Myoung et al. | | EP | 0546824 A1 | 6/1993 |
| 2003/0037640 A1 | 2/2003 | Griffin et al. | | EP | 0308143 | 11/1993 |
| 2003/0069632 A1 | 4/2003 | De Scheerder et al. | | EP | 0573943 A1 | 12/1993 |
| 2003/0108777 A1 | 6/2003 | Gunsel et al. | | EP | 0619504 A1 | 10/1994 |
| 2003/0114094 A1 | 6/2003 | Myoung et al. | | EP | 0621136 A2 | 10/1994 |
| 2003/0128903 A1 | 7/2003 | Yasuda et al. | | EP | 0624353 A3 | 11/1994 |
| 2003/0159919 A1 | 8/2003 | Fairbairn et al. | | EP | 0624354 A3 | 11/1994 |
| 2003/0162672 A1 * | 8/2003 | Shirahama et al. ........... 508/291 | | EP | 0378378 B1 | 1/1995 |
| 2003/0168323 A1 | 9/2003 | Frost | | EP | 0651069 A1 | 5/1995 |
| 2003/0180565 A1 | 9/2003 | Herbst-Dederichs | | EP | 0652301 A1 | 5/1995 |
| 2003/0199741 A1 | 10/2003 | Martinez | | EP | 0656458 A3 | 6/1995 |
| 2003/0234371 A1 | 12/2003 | Ziegler | | EP | 0 661 470 | 7/1995 |
| 2003/0235691 A1 | 12/2003 | Griffin et al. | | EP | 0396603 B1 | 6/1996 |
| 2004/0003638 A1 | 1/2004 | Schaefer et al. | | EP | 0 731 190 | 9/1996 |
| 2004/0008406 A1 | 1/2004 | Blitstein | | EP | 0388800 B1 | 12/1996 |
| 2004/0010068 A1 | 1/2004 | Doren et al. | | EP | 0 759 519 | 2/1997 |
| 2004/0011900 A1 | 1/2004 | Gebhardt et al. | | EP | 0474369 B1 | 3/1997 |
| 2004/0027018 A1 | 2/2004 | LeBlanc et al. | | EP | 0 818 622 | 1/1998 |
| 2004/0035375 A1 | 2/2004 | Gibisch et al. | | EP | 0652301 B1 | 1/1998 |
| 2004/0074467 A1 | 4/2004 | Hamada et al. | | EP | 0826790 A1 | 3/1998 |
| 2004/0092405 A1 | 5/2004 | Konishi et al. | | EP | 0842754 A1 | 5/1998 |
| 2004/0105806 A1 | 6/2004 | Griffin et al. | | EP | 0 870 820 | 10/1998 |
| 2004/0109621 A1 | 6/2004 | Frost | | EP | 0816112 A3 | 10/1998 |
| 2004/0115435 A1 | 6/2004 | Griffin et al. | | EP | 0882759 A1 | 12/1998 |
| 2004/0133301 A1 | 7/2004 | Van Doren et al. | | EP | 0893677 B1 | 1/1999 |
| 2004/0154570 A1 | 8/2004 | Mabuchi et al. | | EP | 0624353 B1 | 2/1999 |
| 2004/0168326 A1 | 9/2004 | Korb et al. | | EP | 0656458 B1 | 2/1999 |
| 2004/0184687 A1 | 9/2004 | Morales et al. | | EP | 0 905 221 A1 | 3/1999 |
| 2004/0223256 A1 | 11/2004 | Feng et al. | | EP | 0 905 419 | 3/1999 |
| 2004/0241448 A1 | 12/2004 | Kano et al. | | EP | 0647318 B1 | 3/1999 |
| 2004/0242435 A1 | 12/2004 | Nishimura et al. | | EP | 0651069 B1 | 3/1999 |
| 2004/0244539 A1 | 12/2004 | Korb et al. | | EP | 0949200 A1 | 10/1999 |
| 2004/0261614 A1 | 12/2004 | Hamada et al. | | EP | 0845154 B1 | 11/1999 |
| 2005/0001201 A1 | 1/2005 | Bocko et al. | | EP | 0624354 B1 | 12/1999 |
| 2005/0005892 A1 | 1/2005 | Nishimura et al. | | EP | 0582676 B1 | 3/2000 |
| 2005/0025975 A1 | 2/2005 | Okamoto et al. | | EP | 1063085 A1 | 12/2000 |
| 2005/0035222 A1 | 2/2005 | Hamada et al. | | EP | 1 067 211 | 1/2001 |
| 2005/0037879 A1 | 2/2005 | Murata et al. | | EP | 0850126 B1 | 1/2001 |
| 2005/0056241 A1 | 3/2005 | Nomura et al. | | EP | 1076087 | 2/2001 |
| 2005/0061291 A1 | 3/2005 | Nishimura et al. | | EP | 1078736 A1 | 2/2001 |
| 2005/0061636 A1 | 3/2005 | Frost et al. | | EP | 1109196 A1 | 6/2001 |
| 2005/0064196 A1 | 3/2005 | Martin et al. | | EP | 0778902 B1 | 9/2001 |
| 2005/0082139 A1 | 4/2005 | Ishikawa et al. | | EP | 1 154 012 | 11/2001 |
| 2005/0084390 A1 | 4/2005 | Ueno et al. | | EP | 0826790 B1 | 11/2001 |
| 2005/0089685 A1 | 4/2005 | Hamada et al. | | EP | 1034320 B1 | 12/2001 |
| 2005/0098134 A1 | 5/2005 | Nishimura et al. | | EP | 0893677 B1 | 1/2002 |
| 2005/0100701 A1 | 5/2005 | Hamada et al. | | EP | 0850133 B1 | 2/2002 |
| 2005/0115744 A1 | 6/2005 | Griffin et al. | | EP | 1184480 A2 | 3/2002 |
| 2005/0188942 A1 | 9/2005 | Hamada et al. | | EP | 1190791 A3 | 4/2002 |
| | | | | EP | 1219464 A2 | 7/2002 |
| | FOREIGN PATENT DOCUMENTS | | | EP | 1 233 054 A1 | 8/2002 |
| DE | 643 034 | 3/1937 | | EP | 0971812 B1 | 10/2002 |
| DE | 19507086 A1 | 9/1996 | | EP | 1018291 B1 | 10/2002 |
| DE | 19507086 C2 | 9/1996 | | EP | 1281513 A2 | 2/2003 |
| DE | 197 04 224 | 8/1997 | | EP | 1 300 608 | 4/2003 |
| DE | 198 15 989 | 10/1999 | | EP | 0950123 B1 | 5/2003 |
| DE | 19825860 A1 | 12/1999 | | EP | 0882759 B1 | 6/2003 |
| DE | 100 17 459 | 10/2000 | | EP | 1 338 641 | 8/2003 |
| DE | 100 61 697 A1 | 5/2002 | | EP | 1340605 A1 | 9/2003 |
| DE | 101 58 683 | 6/2003 | | EP | 1365141 A1 * | 11/2003 |
| DE | 103 18 135 | 11/2003 | | EP | 1083946 B1 | 12/2003 |
| DE | 10337559 A1 | 3/2005 | | EP | 1078736 B1 * | 1/2004 |
| EP | 0 286 996 | 10/1988 | | EP | 1378271 A1 * | 1/2004 |
| EP | 0 291 006 A2 | 11/1988 | | EP | 0757615 B1 | 3/2004 |
| EP | 0 299 785 | 1/1989 | | EP | 0842754 B1 * | 3/2004 |
| EP | 0308143 B1 | 3/1989 | | EP | 1 411 145 | 4/2004 |
| EP | 0 333 416 | 9/1989 | | EP | 0862395 B1 * | 4/2004 |
| EP | 0378378 B1 | 7/1990 | | EP | 1 418 353 A2 | 5/2004 |
| EP | 0384772 A1 | 8/1990 | | EP | 1440775 A1 | 7/2004 |
| EP | 0388800 A2 | 9/1990 | | EP | 1445119 A1 * | 8/2004 |
| EP | 0392125 A1 | 10/1990 | | EP | 1475557 A1 * | 11/2004 |
| EP | 0398985 B1 | 11/1990 | | EP | 1481699 A1 * | 12/2004 |
| EP | 407977 | 1/1991 | | EP | 1482190 A2 | 12/2004 |

| | | | | | | |
|---|---|---|---|---|---|---|
| EP | 1498597 A1 * | 1/2005 | | WO | WO 96/04485 | 2/1996 |
| EP | 1 510 594 A2 | 3/2005 | | WO | WO 96/05333 A1 | 2/1996 |
| EP | 1311885 B1 * | 3/2005 | | WO | WO 96/05942 A1 | 2/1996 |
| EP | 1512781 A2 | 3/2005 | | WO | WO 96/06961 A1 | 3/1996 |
| EP | 1183470 B1 | 4/2005 | | WO | WO 96/12389 A1 | 4/1996 |
| FR | 2 669 689 | 5/1992 | | WO | WO 96/24488 A1 | 8/1996 |
| GB | 768226 | 2/1957 | | WO | WO 96/40446 A1 | 12/1996 |
| GB | 1005638 | 10/1988 | | WO | WO 97/07531 A1 | 2/1997 |
| GB | 2338716 | 12/1999 | | WO | WO 97/10093 A1 | 3/1997 |
| IE | 0990532 A1 | 3/2001 | | WO | WO 97/10940 A1 | 3/1997 |
| JP | 62-111106 | 5/1987 | | WO | WO 97/14555 | 4/1997 |
| JP | 63-21209 A2 | 1/1988 | | WO | WO 97/16138 A1 | 5/1997 |
| JP | 63-288994 A2 | 11/1988 | | WO | WO 98/02715 A1 | 1/1998 |
| JP | 5-70879 | 3/1993 | | WO | WO 98/12994 A1 | 4/1998 |
| JP | 5-36004 | 5/1993 | | WO | WO 98/13528 A1 | 4/1998 |
| JP | 5-42616 | 6/1993 | | WO | WO 98/47141 A1 | 10/1998 |
| JP | 6-264993 | 9/1994 | | WO | WO 99/09547 A1 | 2/1999 |
| JP | 6-294307 | 10/1994 | | WO | WO 99/12404 A1 | 3/1999 |
| JP | 7-63135 | 3/1995 | | WO | WO 99/14512 A1 | 3/1999 |
| JP | 07-090553 | 4/1995 | | WO | WO 99/16371 A1 | 4/1999 |
| JP | 7-103238 | 4/1995 | | WO | WO 99/22694 A2 | 5/1999 |
| JP | 07-118832 | 5/1995 | | WO | WO 99/27157 A1 | 6/1999 |
| JP | 7-41386 A2 | 10/1995 | | WO | WO 99/29477 A1 | 6/1999 |
| JP | 7-286696 | 10/1995 | | WO | WO 99/31557 A1 | 6/1999 |
| JP | 8-14014 | 1/1996 | | WO | WO 99/34385 A1 | 7/1999 |
| JP | 8-61499 | 3/1996 | | WO | WO 99/46847 A1 | 9/1999 |
| JP | 9-20981 A2 | 1/1997 | | WO | WO 99/54520 A1 | 10/1999 |
| JP | 52006318 | 1/1997 | | WO | WO 99/54934 A1 | 10/1999 |
| JP | 253770 A2 | 9/1997 | | WO | WO 99/57743 A1 | 11/1999 |
| JP | 10-088369 A2 | 4/1998 | | WO | WO 99/62077 A1 | 12/1999 |
| JP | 10-265790 | 10/1998 | | WO | WO 99/62572 A1 | 12/1999 |
| JP | 10-298440 A2 | 11/1998 | | WO | WO 00/22613 A1 | 4/2000 |
| JP | 11-22423 | 1/1999 | | WO | WO 00/24554 A1 | 5/2000 |
| JP | 11-190406 | 7/1999 | | WO | WO 00/25410 A1 | 5/2000 |
| JP | 11-292629 A2 | 10/1999 | | WO | WO 00/28142 A1 | 5/2000 |
| JP | 11-294118 | 10/1999 | | WO | WO 00/33051 A1 | 6/2000 |
| JP | 11-333773 A2 | 12/1999 | | WO | WO 00/35000 A1 | 6/2000 |
| JP | 2000-88104 | 3/2000 | | WO | WO 00/44032 A1 | 7/2000 |
| JP | 2000-119843 | 4/2000 | | WO | WO 00/47402 A1 | 8/2000 |
| JP | 2000-504089 | 4/2000 | | WO | WO 00/55385 A1 | 9/2000 |
| JP | 2000-297373 | 10/2000 | | WO | WO 00/56127 A1 | 9/2000 |
| JP | 2000-327484 | 11/2000 | | WO | WO 00/56393 A1 | 9/2000 |
| JP | 2000-339083 | 12/2000 | | WO | WO 00/62327 A2 | 10/2000 |
| JP | 2001-62605 | 3/2001 | | WO | WO 00/68451 A1 | 11/2000 |
| JP | 2001-64005 | 3/2001 | | WO | WO 00/75517 A1 | 12/2000 |
| JP | 2001-93141 A2 | 4/2001 | | WO | WO 00/78504 A1 | 12/2000 |
| JP | 2001-172766 | 6/2001 | | WO | WO 01/05917 | 1/2001 |
| JP | 2001-172766 A2 | 6/2001 | | WO | WO 01/006033 | 2/2001 |
| JP | 2001-192864 | 7/2001 | | WO | WO 01/14736 A1 | 3/2001 |
| JP | 2001-269938 | 10/2001 | | WO | WO 01/14745 A1 | 3/2001 |
| JP | 2001-280236 | 10/2001 | | WO | WO 01/26862 A1 | 4/2001 |
| JP | 2002-265968 A2 | 9/2002 | | WO | WO 01/37631 A2 | 5/2001 |
| JP | 2002-309912 | 10/2002 | | WO | WO 01/40537 A1 | 6/2001 |
| JP | 2002-332571 | 11/2002 | | WO | WO 01/47451 A1 | 7/2001 |
| JP | 2003-13163 | 1/2003 | | WO | WO 01/59544 A2 | 8/2001 |
| JP | 2003-13799 | 1/2003 | | WO | WO 01/61182 | 8/2001 |
| JP | 2003-25117 | 1/2003 | | WO | WO 01/61719 A1 | 8/2001 |
| JP | 2003-28174 A2 | 1/2003 | | WO | WO 01/62372 A1 | 8/2001 |
| JP | 2003-88939 | 3/2003 | | WO | WO 01/63639 A1 | 8/2001 |
| JP | 2003-113941 | 4/2003 | | WO | WO 01/67834 A1 | 9/2001 |
| JP | 2003-147508 | 5/2003 | | WO | WO 01/79583 A2 | 10/2001 |
| JP | 2004-36788 A2 | 2/2004 | | WO | WO 01/80224 A1 | 10/2001 |
| JP | 2005-68529 A2 | 3/2005 | | WO | WO 02/006875 A1 | 1/2002 |
| RU | 2004586 C1 | 12/1993 | | WO | WO 02/13188 A1 | 2/2002 |
| RU | 2153782 C1 | 7/2000 | | WO | WO 02/24601 A1 | 3/2002 |
| SU | 1770350 A1 | 10/1992 | | WO | WO 02/24603 A1 | 3/2002 |
| WO | WO 89/06707 A1 | 7/1989 | | WO | WO 02/24970 A2 | 3/2002 |
| WO | WO 89/06708 A1 | 7/1989 | | WO | WO 02/32625 A2 | 4/2002 |
| WO | WO 8906338 A1 | 7/1989 | | WO | WO 02/44440 A1 | 6/2002 |
| WO | WO 92/02602 | 2/1992 | | WO | WO 02/054454 A2 | 7/2002 |
| WO | WO 9206843 A1 | 4/1992 | | WO | WO 02/062714 A2 | 8/2002 |
| WO | WO 9219425 A2 | 11/1992 | | WO | WO 02/073021 | 9/2002 |
| WO | WO 93/21288 | 10/1993 | | WO | WO 02/080996 A1 | 10/2002 |
| WO | WO 93/21289 | 10/1993 | | WO | WO 02/085237 A2 | 10/2002 |
| WO | WO 9324828 A1 | 12/1993 | | WO | WO 02/090461 A1 | 11/2002 |
| WO | WO 95/20253 A2 | 7/1995 | | WO | WO 02/097289 A1 | 12/2002 |
| WO | WO 95/29044 A1 | 11/1995 | | WO | WO 03/009978 A1 * | 2/2003 |
| WO | WO 95/29273 A1 | 11/1995 | | WO | WO 03/013990 A1 | 2/2003 |
| WO | WO 95/31584 A1 | 11/1995 | | WO | WO 03/020329 A1 | 3/2003 |

| | | |
|---|---|---|
| WO | WO 03/021731 A1 * | 3/2003 |
| WO | WO 03/031543 A2 | 4/2003 |
| WO | WO 2003/046508 A3 * | 6/2003 |
| WO | WO 03/054876 A1 | 7/2003 |
| WO | WO 03/076309 A2 | 9/2003 |
| WO | WO 03/078679 A1 | 9/2003 |
| WO | WO 03/091758 A2 | 11/2003 |
| WO | WO 2003/095009 A1 * | 11/2003 |
| WO | WO 03/105134 A1 | 12/2003 |
| WO | WO 2004/001804 A2 | 12/2003 |
| WO | WO 2004/004998 A1 | 1/2004 |
| WO | WO 2004/019809 A2 * | 3/2004 |
| WO | WO 2004/024206 A1 | 3/2004 |
| WO | WO 2004/026359 A1 * | 4/2004 |
| WO | WO 2004/026500 A2 * | 4/2004 |
| WO | WO 2004/036169 A1 * | 4/2004 |
| WO | WO 2004/036292 A2 * | 4/2004 |
| WO | WO 2004/038701 A1 * | 5/2004 |
| WO | WO 2004/043631 A1 | 5/2004 |
| WO | WO 2004/048126 A2 | 6/2004 |
| WO | WO 2004/067466 A1 | 8/2004 |
| WO | WO 2004/068530 A1 | 8/2004 |
| WO | WO 2004/071670 A1 * | 8/2004 |
| WO | WO 2004/072959 A2 * | 8/2004 |
| WO | WO 2004/078424 A2 * | 9/2004 |
| WO | WO 2004/084773 A1 * | 10/2004 |
| WO | WO 2004/088113 A1 * | 10/2004 |
| WO | WO 2005/010596 A2 | 2/2005 |
| WO | WO 2005/011744 A1 * | 2/2005 |
| WO | WO 2005/014760 A1 | 2/2005 |
| WO | WO 2005/014882 A1 | 2/2005 |
| WO | WO 2005/016620 A2 | 2/2005 |
| WO | WO 2005/021851 A1 | 3/2005 |
| WO | WO 2005/025844 A1 * | 3/2005 |
| WO | WO 2005/034791 A1 * | 4/2005 |
| WO | WO 2005/037144 A2 * | 4/2005 |
| WO | WO 2005/037985 A2 | 4/2005 |
| WO | WO 2005/040451 A1 | 5/2005 |
| WO | WO 2005/042064 A1 | 5/2005 |
| WO | WO 2005/047737 A1 | 5/2005 |

OTHER PUBLICATIONS

Hershberger, J., et al., "Evaluation of DLC Coatings for Spark-Ignited, Direct-Injected Fuel Systems," *Surface & Coatings Technology*, 179, 2004, pp. 237-244.

Hershberger, J, et al., "Friction and Wear Behavior of Near-Frictionless Carbon Coatings in Formulated Gasolines," *Surface & Coating Technology*, 183, 2004, pp. 111-117.

Kovalchenko, A., et al., "Friction and Wear Performance of Low-Friction Carbgn Coatings Under Oil Lubrication," Energy Technology Div., Argonne National Laboratory.

Ajayi, O., et al., "Effect of Carbon Coating on Scuffing Performance in Diesel Fuels," *Tribology Transactions*, vol. 44, 2001, pp. 298-304.

Ajayi, O., et al., Effect of Thin-Film Coating on Wear in EGR-Contaminated Oil, Energy Technology Div., Argonne National Laboratory.

Fujimori, N., et al., "Characterization of Conducting Diamond Films," *Vacuum*, vol. 36, Nos. 1-3, 1996, pp. 99-102.

Patent/Literature Search Report, Bawa Biotechnology Consulting, LLC, Jun. 3, 2005 (201 pages).

"Aluminum Alloy Die Castings," Japanese Industrial Standard (JIS H 5302), 2000, pp. 1-12.

"Aluminum Alloys Castings", Japanese Industrial Standard (JIS H 5202), 1999 (18 pages).

Japanese Industrial Standard, "Aluminum Alloy Castings", JIS H 5202, 1999, pp. 1910, 1911 and 1636-1647.

"Aluminum Alloy Die Castings," JIS H5302 (2000), pp. 1670-1681.

"Assessment of 2nd to 5th Order Irregularities of Surface Configuration by Means of Sections of Surfaces Definitions Relating to reference System and Dimensions," DIN 4762, UDC 621-288:001.4 (Aug. 1960), pp. 1-4.

API Motor Oil Guide, Which Oil is Right for You American Petroleum Institute, Copyright 2002.

"Carbon Steels for Machine Structural Use", Japanese Industrial Standard (JIS G 4051), 1979, pages 1381-1383.

"Carbon Steels for Machine Structural Use", Japanese Industrial Standard (JIS G 4051), 1979, pp. 1-10.

"Chromium Molybdenum Steels," Japanese Industrial Standard (JIS G 4105), 1979, pp. 1-11 (with Translation).

"Chromium Steels," Japanese Industrial Standard (JIS G 4104), 1979, pp. 1-9.

D.G. Watson et al., "Engineering Drawing Practice," XP002281300, University of Hertfordshire, Sep. 1991, p. 29, Figure 38.

Database WPI, Nov. 28, 2000, Derwent Publications, Ltd., AN 2000640583, XP002240184, JP 2000-327484, 28-11-2000.

Dr. Marx, "Surfaces and Contact Mechanics", XP-002233233, Google, Retrieved from the Internet, Mar. 3, 2003 pp. 1-18.

Engine Oil Viscosity Classification—SAE J300 revised Apr. 1997 p. 133.

"Geometrical Product Specifications (GPS)—Surface Texture: Profile Method—Terms, Definitions and Surface Texture Parameters," International Standard, ISO 4287, TC 213 (1997), pp. 1-25.

"Geometrical Product Specifications (GPS)—Surface texture: Profile method—Terms, Definitions and surface texture parameters", Japanese Industrial Standard (JIS B 0601) Machine Elements, 2003, pp. 6, 7, 263-287, and 2586.

"Grey iron castings", Japanese Industrial Standard (JIS G 5501), pp. 2075-2077.

International Standard "Application of Carbides for Machining by Chip Removal—Designation of the Main Groups of Chip Removal and Groups of Application," ISO 513, (1975), pp. 67-69.

International Standard, "Petroleum products—Determination of base number—Perchloric acid potentiometric titration method", ISO 3771, second edition Aug. 15, 1994, pp. 1-8.

Japanese Industrial Standard, "Structural Steels with Specified Hardenability Bands", JIS G 4052, 1979, pp. 2414, 2415, 1390-1403, 1410 and 1411.

JIS Japanese Industrial Standard; "Surface Roughness—Definitions and Designation"; JIS B 0601; 1994, (w/Translation).

JIS Japanese Industrial Standard; "Vickers Hardness Test—Test Method"; JIS Z 2244; 1998; (w/Translation).

Japanese Industrial Standard, 2001, No. B 0601.

K. Holmberg et al., "Tribological Characteristics of Diamond-like Carbon Coatings," VTT Symposium, Technical Research Centre of Finland, XP000570636, 1994, pp. 24-238.

M. Kano et al., "The Effect of ZDDP and MODTC Additives on Friction Properties of DLC and Steel Cam Follower in Engine Oil", Abstracts of Papers from 2nd World Tribology Congress, Sep. 3-7, 2001, p. 342.

Meyer-Rässler, "Neuartige Lauffiächen-Schutzverfahren für Kolben von Verbrennungsmotoren," VDI-Zeitschrift, 1942, vol. 86, No. 15/16, pp. 245 to 247.

Patent Abstracts of Japan, vol. 1996, No. 09, Sep. 30, 1996, JP 08-128448, May 121, 996.

Patent Abstracts of Japan, vol. 2000, No. 01, Jan. 31, 2000, JP 11-287329, Oct. 19, 1999.

Patent Abstracts of Japan, vol. 2000, No. 09, Oct. 13, 2000, JP 2000-170768, Jun. 20, 2000.

PCT/IB2004/002552.

"Stainless Steel Bars", Japanese Industrial Standard (JIS G 4303), pp. 1457-1477.

"Standard Practice for Codification of Certain Nonferrous Metals and Alloys, Cast and Wrought[1]", ASTM International, Designation: B 275-02, Jun. 2002, pp. 1-7.

"Standard Test Method for Calibration and Operation of the Falex Block-on-Ring Friction and Wear Testing Machine", ASTM Designation: D2714-88, Jan. 1989, pp. 383-386.

Steve J. Bull et al., "High-Performance Diamond and Diamond-like Coatings", JOM, Apr. 1995, pp. 16-19, vol. 47, No. 4, XP000500980.

Patent Abstracts of Japan, vol. 2003, No. 12, 5 Dec. 2003, JP 2004-155891, Jun. 3, 2004.

U.S. Appl. No. 10/911,741, filed May 5, 2004, Ueno.

Ronkainen, Helena, "Tribological Properties of Hydrogenated and Hydrogen-Free Diamond-Like Carbon Coatings," Disseration for the Degree of Doctor of Science in Technology, VTT Publications No. 434.

Kano et al., "Friction Characteristics of a Hard Carbon Film in Engine Oil, (No. 2) (Surface Analysis Result of Sliding Surface)," Japan Tribology Congress, 1999, 5, pp. 11-12.

Japanese Industrial Standard, "High Carbon Chromium Bearing Steels," JIS G 4805, 1999, pp. 1-31.

"Standard Test Method for Separation of Representative Aromatics and Nonaromatics Fractions of High-Boiling Oils by Elution Chromatography[1]," ASTM, Designation: D 2549-91, (Reapproved 1995), pp. 895-900.

Japanese Industrial Standard, "Aluminum Alloy Castings," JIS H 5202, 1999, pp. 1-17.

* cited by examiner

FIGURE
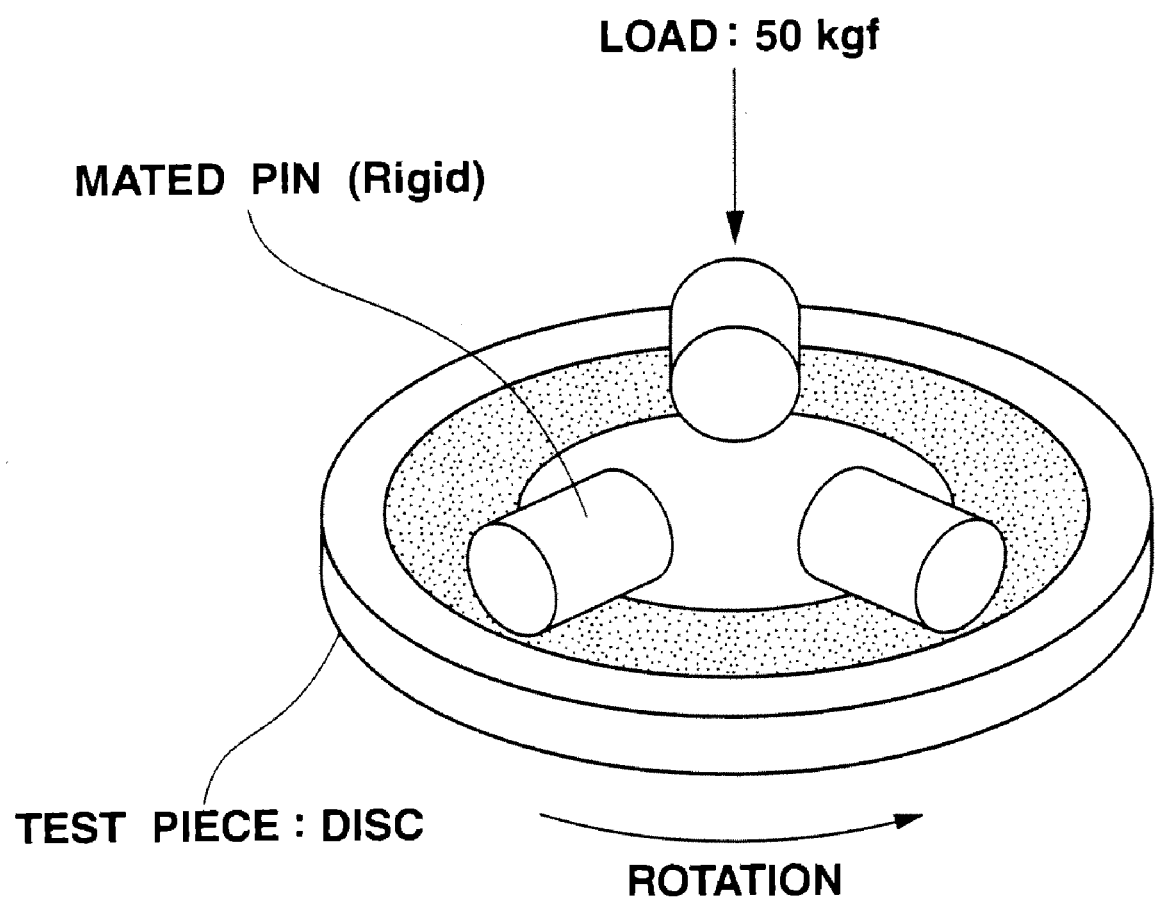

LOW-FRICTION SLIDING MECHANISM

The present application is a continuation of U.S. application Ser. No. 11/955,949, filed Dec. 13, 2007 now abandoned, which is a continuation of U.S. application Ser. No. 11/123,016, filed May 6, 2005 now U.S. Pat. No. 7,322,749, which is a divisional of U.S. application Ser. No. 10/692,853, filed Oct. 27, 2003 now U.S. Pat. No. 6,969,198, which claims priority from Japanese Patent Application No. 2002-322322 filed on Nov. 6, 2002; Japanese Patent Application No. 2003-207056 filed on Aug. 11, 2003; and Japanese Patent Application No. 2003-208193 filed on Aug. 21, 2003 the entire contents of which are incorporated herein by reference.

BACKGROUND OF THE INVENTION

The present invention relates to a sliding mechanism having excellent low-friction characteristics, particularly of the kind for use in an internal combustion engine, a drive train or a hard disk drive.

Global environmental problems such as global warming and ozone layer destruction are coming to the fore. As it is said that the global warming is significantly effected by $CO_2$ emission, the reduction of $CO_2$ emission, notably the setting of $CO_2$ emission standards, has become a big concern to each country.

One of challenges to reduce $CO_2$ emission is to improve vehicle fuel efficiency that depends on the performance of engine sliding members and a lubricant applied thereto. There are the following approaches to improving vehicle fuel efficiency: (1) to provide higher abrasion resistance and a lower friction coefficient for the sliding members, which are generally made of steel materials in the earlier technology, even under extreme conditions of abrasion and friction; (2) to lower the viscosity of the lubricant, thereby reducing viscous resistance in hydrodynamic lubrication regions and agitation resistance in the engine; and (3) to mix a suitable friction modifier and other additives into the lubricant so as to reduce friction losses under the conditions of mixed lubrication and boundary lubrication.

In view of the foregoing, many studies have been made on various friction modifiers including organomolybdenum compounds, such as molybdenum dithiocarbamate (MoDTC) and molybdenum dithiophosphate (MoDTP). As a result of the studies, it is found that the lubricant containing an organomolybdenum compound successfully produces a friction reducing effect on the steel sliding members in the early stages of use.

SUMMARY OF THE INVENTION

Heretofore, the application of hard coating materials to the engine sliding members has been also examined so that the sliding members can attain high abrasion resistance and a low friction coefficient. Above all, a diamond-like carbon (DLC) material is known for its low-friction performance in the air and therefore expected to be useful as a coating material for the sliding members.

However, the DLC material does not provide a low friction coefficient in the presence of a lubricant (as disclosed in Japan Tribology Congress 1999. 5, Tokyo, Proceeding Page 11-12, KANO et. al.). Even when used in combination with the lubricant containing an organomolybdenum compound, the DLC material cannot provide a sufficiently low friction coefficient (as disclosed in World Tribology Congress 2001. 9, Vienna, Proceeding Page 342, KANO et. al.).

It is therefore an object of the present invention to provide a sliding mechanism having stably excellent low-friction characteristics and high abrasion resistance so as to attain, when used in an automotive engine, more improvement in vehicle fuel efficiency than that attained by the earlier technology.

According to an aspect of the present invention, there is provided a low-friction sliding mechanism, comprising: a first sliding member having a sliding surface, at least the sliding surface of the first sliding member being made of a diamond-like carbon material; a second sliding member having a sliding surface slidable relative to the sliding surface of the first sliding member, at least the sliding surface of the second sliding member being made of either one of an aluminum-based alloy material, a magnesium-based alloy material and a diamond-like carbon material; and a lubricant applied to the sliding surfaces of the first and second sliding members, the lubricant comprising at least one of an ashless fatty-ester friction modifier and an ashless aliphatic-amine friction modifier.

The other objects and features of the invention will also become understood from the following description.

BRIEF DESCRIPTION OF THE DRAWINGS

FIGURE is a schematic illustration of an abrasion test unit.

DESCRIPTION OF THE EMBODIMENTS

The present invention will be described below in detail. In the following description, all percentages (%) are by mass unless otherwise specified.

A sliding mechanism according to an exemplary embodiment of the present invention includes a first sliding member having a sliding surface, a second sliding member having a sliding surface slidable relative to the sliding surface of the first sliding member, and a lubricant applied to the sliding surfaces of the first and second sliding members.

The first sliding member has at least its sliding surface made of a diamond-like carbon (DLC) material, and generally includes a base made of e.g. an iron-based material, an aluminum-based alloy material or a resinous material and a coating of DLC material (hereinafter just referred to as a "DLC coating") applied to the base so as to define the sliding surface. The first sliding member may alternatively be formed in one piece of DLC material. Herein, the DLC material is defined as an amorphous form of carbon in which carbon exists in both $sp^2$ and $sp^3$ hybridizations so as to have a composite structure of graphite and diamond. Specific examples of the DLC material usable in the present invention include hydrogen-free amorphous carbon (a-C) that consists of carbon, hydrogen-containing amorphous carbon (a-C:H) and metal carbide (MeC) that contains a metal element of titanium (Ti) or Molybdenum (Mo). For a significant reduction in friction, hydrogen-free amorphous carbon (a-C) is preferably used.

The second sliding member has at least its sliding surface made of either an aluminum-based alloy material, a magnesium-based alloy material or a DLC material.

The aluminum-based material for the second sliding member is preferably a hypoeutectic or hypereutectic aluminum-based alloy containing 4 to 20% silicon (Si) and 1.0 to 5.0% copper (Cu). Specific examples of the aluminum-based alloy include AC2A, AC8A, ADC12 and ADC14 in compliance with JIS H5205.

The magnesium-based alloy material for the sliding member is selected for the group consisting of magnesium-aluminum-zinc (Mg—Al—Zn) alloys, magnesium-aluminum-rare earth metal (Mg—Al-REM) alloys, magnesium-aluminum-calcium (Mg—Al—Ca) alloys, magnesium-zinc-aluminum-calcium (Mg—Zn—Al—Ca) alloys, magnesium-aluminum-calcium-rare earth metal (Mg—Al—Ca-REM) alloys, magnesium-aluminum-strontium (Mg—Al—Sr) alloys, magnesium-aluminum-silicon (Mg—Al—Si) alloys, magnesium-rare earth metal-zinc (Mg-REM-Zn) alloys, magnesium-silver-rare earth metal (Mg—Ag-REM) alloys, magnesium-yttrium-rare earth metal (Mg—Y-REM) alloys and combinations thereof. Specific examples of the magnesium-based alloy include AZ91, AE42, AX51, AXJ, ZAX85, AXE522, AJ52, AS21, QE22 and WE43 in compliance with ASTM.

The DLC material usable for the second sliding member can be exemplified by hydrogen-free amorphous carbon (a-C) that consists of carbon, hydrogen-containing amorphous carbon (a-C:H) and metal carbide (MeC) that contains a metal element of titanium (Ti) or molybdenum (Mo), as in the case with the DLC material usable for the first sliding member. Among these DLC materials, hydrogen-free amorphous carbon (a-C) is preferably used. In a case where at least the sliding surface of the second sliding member is of DLC material, the second sliding member generally has a base made of e.g. an iron-based material, an aluminum-based alloy material or a resinous material and a coating of DLC material (hereinafter referred to as a "DLC coating") applied to the base so as to define the sliding surface. Alternatively, the second sliding member may be formed in one piece of DLC material. Further, it is preferable that at least one of the DLC materials of the first and second sliding members is hydrogen-free amorphous carbon (a-C).

Each of the sliding surfaces of the first and second sliding members preferably has an arithmetic mean roughness Ra of 0.1 μm or lower so as to attain a stable sliding between the first and second sliding members. When the surface roughness Ra exceeds 0.1 μm, the sliding surfaces of the first and second sliding members are locally subjected to scuffing to cause a great deterioration in friction coefficient.

Further, the DLC coating of the first sliding member preferably has a thickness of 0.3 to 2.0 μm and a micro Vickers hardness $H_V$ of 1000 to 3500 as measured by the application of a 10 g load. When the thickness is less than 0.3 μm and the micro Vickers hardness $H_V$ is less than 1000, the DLC coating is prone to wear. On the other hand, the DLC coating tends to be separated from the base when the thickness exceeds 2.0 μm and the micro Vickers hardness exceeds 3500.

The sliding surface of the second sliding member, when the second sliding member is made of the above aluminum-based alloy material, preferably has a Brinell hardness $H_B$ of 80 to 130. If the Brinell hardness $H_B$ is less than 80, the sliding surface of the second sliding surface is prone to wear.

The sliding surface of the second sliding member, when the second sliding member is made of the above magnesium-based alloy material, preferably has a Brinell hardness $H_B$ of 45 to 95. If the Brinell hardness $H_B$ is less than 45, the sliding surface of the second sliding surface is also prone to wear.

When the sliding surface of the second sliding member is made of the above DLC material, the DLC coating of the second sliding member preferably has a thickness of 0.3 to 2.0 μm and a micro Vickers hardness $H_V$ of 1000 to 3500 as measured by the application of a 10 g load. When the thickness is less than 0.3 μm and the micro Vickers hardness $H_V$ is less than 1000, the DLC coating is prone to wear. On the other hand, the DLC coating tends to be separated from the base when the thickness exceeds 2.0 μm and the micro Vickers hardness exceeds 3500.

The lubricant includes a base oil and at least one of an ashless fatty-ester friction modifier and an ashless aliphatic-amine friction modifier.

The base oil is not particularly limited and can be any base oil compound or compounds commonly used for a lubricant, such as a mineral oil or a synthetic oil.

Specific examples of the mineral oil include oil compounds prepared by extracting a lubricant fraction from petroleum by atmospheric or reduced-pressure distillation, and then, purifying the obtained lubricant fraction by at least one of the following treatments: solvent deasphalting, solvent extraction, hydrocracking, solvent dewaxing, hydrotreating and wax isomerization. In the present invention, the mineral oil prepared through hydrocracking, hydrotreating and/or wax isomerization is preferably used.

Specific examples of the synthetic oil include: alkylbenzenes, alkylnaphthalenes, polybutenes and hydrides thereof; poly-α-olefins, such as 1-octene oligomer and 1-decene oligomer, and hydrides thereof; diesters, such as ditridecyl glutarate, dioctyl adipate, diisodecyl adipate, ditridecyl adipate and dioctyl sebacate; polyol esters, such as trimethylolpropane caprylate, trimethylolpropane pelargonate, pentaerythritol-2-ethyl hexanoate and pentaerythritol pelargonate; and mixtures thereof. Among these synthetic oil compounds, preferred are poly-α-olefins, such as 1-octene oligomer and 1-decene oligomer and hydrides thereof.

The above-mentioned mineral and synthetic oil compounds may be used alone, or in the form of a mixture of any two or more thereof with no limitation on the mixture ratio.

The aromatic content of the base oil is not particularly restricted. Herein, the aromatic content is defined as the amount of aromatics fractions determined according to ASTM D2549 "Standard Test Method for Separation of Representative Aromatics and Nonaromatics Fractions of High-Boiling Oils by Elution Chromatography". The aromatics fractions generally include alkylbenzenes, alkylnaphthalenes, anthracene, phenanthrene and alkylates thereof, condensed-ring compounds having four or more benzeoid rings fused together, and heteroaromatic compounds such as pyridines, quinolines, phenols and naphtols. In the present invention, the aromatic content of the base oil is preferably 15% or less, more preferably 10% or less, and most preferably 8% or less. When the aromatic content exceeds 15%, the base oil undesirably deteriorates in oxidation stability. It is noted that the lubricant may be able to produce a high friction reducing effect, even if the aromatic content of the base oil is 2% or less (inclusive of 0%). In such a case, however, there arise a possibility that the lubricant deteriorates in storage stability, e.g., when the fatty-ester friction modifier and/or aliphatic-amine friction modifier is contained in an amount of more than 1%. The aromatic content of the base oil is thus preferably controlled to e.g. 2% or more by adding solvent refining mineral oil, alkylbenzene or the like as needed.

The kinematic viscosity of the base oil is not particularly restricted. When the lubricant is used for an internal combustion engine, the kinematic viscosity of the base oil is preferably 2 mm$^2$/s or higher, more preferably 3 mm$^2$/s and, at the same time, is preferably 20 mm$^2$/s or lower, more preferably 10 mm$^2$/s or lower, most preferably 8 mm$^2$/s or lower, as measured at 100° C. When the kinematic viscosity is 2 mm$^2$/s or higher at 100° C., the lubricant is able to form a sufficient lubricant film so as to attain a high lubricity and is able to minimize its boil-off under high-pressure conditions. When the kinematic viscosity is 20 mm$^2$/s or lower at 100° C., the lubricant is able to decrease its fluid resistance and minimize friction resistance in lubrication regions.

The viscosity index of the base oil is not particularly restricted, and is preferably 80 or higher, more preferably 100 or higher, most preferably 120 or higher, when the lubricant is used for an internal combustion engine. When the base oil has a higher viscosity index, the lubricant can attain excellent low-temperature viscosity properties and produce a good friction reducing effect.

The fatty-ester friction modifier and the aliphatic-amine friction modifier are an fatty acid ester and an aliphatic amine each having $C_6$-$C_{30}$ straight or branched hydrocarbon chains, preferably $C_8$-$C_{24}$ straight or branched hydrocarbon chains, more preferably $C_{10}$-$C_{20}$ straight or branched hydrocarbon chains. When the carbon number of the hydrocarbon chain is not within the range of 6 to 30, there arises a possibility that the lubricant may not produce a sufficient friction reducing effect as expected.

Specific examples of the $C_6$-$C_{30}$ straight or branched hydrocarbon chain include: alkyl groups, such as hexyl, heptyl, octyl, nonyl, decyl, undecyl, dodecyl, tridecyl, tetradecyl, pentadecyl, hexadecyl, heptadecyl, octadecyl, nonadecyl, icosyl, heneicosyl, docosyl, tricosyl, tetracosyl, pentacosyl, hexacosyl, heptacosyl, octacosyl, nonacosyl and triacontyl; and alkenyl groups, such as hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, icosenyl, heneicosenyl, docosenyl, tricosenyl, tetracosenyl, pentacosenyl, hexacosenyl, heptacosenyl, octacosenyl, nonacosenyl and triacontenyl. The above alkyl and alkenyl groups include all possible isomers.

The fatty acid ester can be exemplified by esters of fatty acids having the above hydrocarbon groups and monofunctional aliphatic alcohols or aliphatic polyols. Specific examples of such fatty acid esters include glycerol monolate, glycerol diolate, sorbitan monolate and sorbitan diolate.

The aliphatic amine can be exemplified by aliphatic monoamines and alkylene oxide adducts thereof, aliphatic polyamines, imidazoline compounds, and derivatives thereof. Specific examples of such aliphatic amines include: aliphatic amine compounds, such as laurylamine, lauryldiethylamine, lauryldiethanolamine, dodecyldipropanolamine, palmitylamine, stearylamine, stearyltetraethylenepentamine, oleylamine, oleylpropylenediamine, oleyldiethanolamine and N-hydroxyethyloleylimidazolyne; adducts of the above aliphatic amines ($C_6$-$C_{28}$ alkyl or alkenyl amines) with alkylene oxides, such as N,N-dipolyoxyalkylene-N-alkylamines; and acid-modified compounds prepared by reacting the above aliphatic amines with $C_2$-$C_{30}$ monocarboxylic acids (such as fatty acids) or $C_2$-$C_{30}$ polycarboxylic acids (such as oxalic acid, phthalic acid, trimellitic acid and pyromellitic acid) so as to neutralize or amidate the whole or part of the remaining amino and/or imino groups. In the present invention, N,N-dipolyoxyethylene-N-oleylamine is preferably used.

The amount of the fatty-ester friction modifier and/or the aliphatic-amine friction modifier added in the lubricant is not particularly restricted, and is preferably 0.05 to 3.0%, more preferably 0.1 to 2.0%, and most preferably 0.5 to 1.4%, based on the total mass of the lubricant. When the amount of the fatty-ester friction modifier and/or the aliphatic-amine friction modifier is less than 0.05%, there arises a possibility that the lubricant may not produce a sufficient friction reducing effect. When the amount of the fatty-ester friction modifier and/or the aliphatic-amine friction modifier exceeds 3.0%, the lubricant produce a good friction reducing effect but undesirably deteriorates in storage stability and compatibility to cause precipitations.

Further, the lubricant desirably includes polybutenyl succinimide and/or a derivative thereof as an ashless dispersant. Specific examples of the polybutenyl succinimide usable in the present invention include compounds represented by the following general formulas (1) and (2).

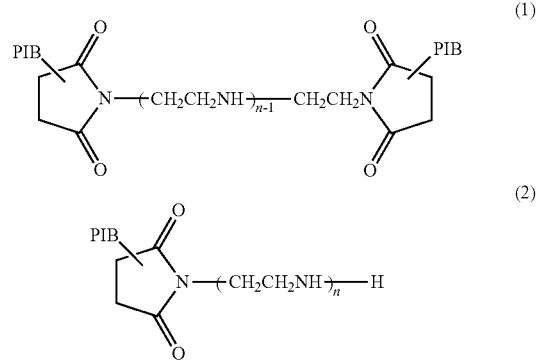

In each of the formulas (1) and (2), n represents an integer of 1 to 5, preferably 2 to 4, so as to attain a good detergent effect. Further, PIB represents a polybutenyl group derived from polybutene. The polybutene can be prepared by polymerizing high-purity isobutene or a mixture of 1-butene and isobutene in the presence of a boron fluoride catalyst or an aluminum chloride catalyst in such a manner that the polybutene attains a number-average molecular weight of 900 to 3,500, preferably 1,000 to 2,000. When the number-average molecular weight of the polybutene is less than 900, there is a possibility of failing to attain a sufficient detergent effect. When the number-average molecular weight of the polybutene exceeds 3,500, the polybutene may undesirably deteriorate in low-temperature fluidity. In the production of the polybutenyl succinimide, the polybutene may be used after purified by removing trace amounts of fluorine and chlorine residues, which result from the above polybutene production catalyst, by any suitable treatment (such as adsorption process or washing process). The amount of the fluorine and chlorine residues is preferably controlled to 50 ppm or less, more preferably 10 ppm or less, most preferably 1 ppm or less.

The production method of the polybutenyl succinimide is not particularly restricted. For example, the polybutenyl succinimide can be prepared by reacting an chloride of the above-mentioned polybutene, or the polybutene from which fluorine and chlorine residues are removed, with maleic anhydride at 100 to 200° C. to form butenyl succinate, and then, reacting the thus-formed butenyl succinate with polyamine (such as diethylene triamine, triethylene tetramine, tetraethylene pentamine or pentaethylene hexamine).

The polybutenyl succinimide derivative can be exemplified by boron- and acid-modified compounds obtained by reacting the polybutenyl succinimide of the formulas (1) and (2) with boron compounds or oxygen-containing organic compounds so as to neutralize or amidate the whole or part of the remaining amino and/or imide groups. In the present invention, boron-containing polybutenyl succinimide, especially boron-containing bis(polybutenyl)succinimide, is preferably used. Herein, the content ratio of nitrogen to boron (B/N) by mass in the boron-containing polybutenyl succinimide is usually 0.1 to 3, preferably 0.2 to 1.

The above boron compound can be a boric acid, a borate or a boric acid ester. Specific examples of the boric acid include orthoboric acid, metaboric acid and paraboric acid. Specific examples of the borate include: ammonium salts including ammonium borates, such as ammonium metaborate, ammonium tetraborate, ammonium pentaborate and ammonium octaborate. Specific examples of the boric acid ester include: esters of boric acids and alkylalcohols (preferably $C_1$-$C_6$ alkylalcohols), such as monomethyl borate, dimethyl borate, trimethyl borate, monoethyl borate, diethyl borate, triethyl borate, monopropyl borate, dipropyl borate, tripropyl borate, monobutyl borate, dibutyl borate and tributyl borate.

The above oxygen-containing organic compound can be exemplified by: $C_1$-$C_{30}$ monocarboxylic acids, such as formic acid, acetic acid, glycolic acid, propionic acid, lactic acid, butyric acid, valeric acid, caproic acid, enanthic acid, caprylic acid, pelargonic acid, capric acid, undecylic acid, lauric acid, tridecanoic acid, myristic acid, pentadecanoic acid, palmitic acid, margaric acid, stearic acid, oleic acid, nonadecanoic acid and eicosanoic acid; $C_2$-$C_{30}$ polycarboxylic acids, such as oxalic acid, phthalic acid, trimellitic acid and pyromellitic acid, and anhydrides and esters thereof; $C_2$-$C_6$ alkylene oxides; and hydroxy(poly)oxyalkylene carbonates.

The amount of the polybutenyl succinimide and/or the derivative thereof added in the lubricant is not particularly restricted, and is preferably 0.1 to 15%, more preferably 1.0 to 12%, based on the total mass of the lubricant. When the amount of the polybutenyl succineimide and/or the derivative thereof is less than 0.1%, there arises a possibility of failing to attain a sufficient detergent effect. It becomes uneconomical when the amount of the polybutenyl succineimide and/or the derivative thereof exceeds 15%. In addition, such a large amount of the polybutenyl succineimide and/or the derivative thereof tends to cause a deterioration in demulsification ability.

Furthermore, the lubricant desirably includes zinc dithiophosphate represented by the following general formula (3) as an antioxidant and as an anti-wear agent.

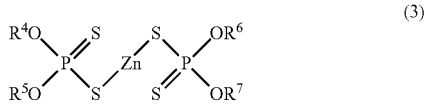

(3)

In the general formula (3), $R^4$, $R^5$, $R^6$ and $R^7$ each represent $C_1$-$C_{24}$ hydrocarbon groups. The $C_1$-$C_{24}$ hydrocarbon group is preferably a $C_1$-$C_{24}$ straight-chain or branched-chain alkyl group, a $C_3$-$C_{24}$ straight-chain or branched-chain alkenyl group, a $C_5$-$C_{13}$ cycloalkyl or straight-chain or branched-chain alkylcycloalkyl group, a $C_6$-$C_{18}$ aryl or straight-chain or branched-chain alkylaryl group, or a $C_7$-$C_{19}$ arylalkyl group. The above alkyl group or alkenyl group can be primary, secondary or tertiary. Specific examples of $R^4$, $R^5$, $R^6$ and $R^7$ include: alkyl groups, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, heneicosyl, docosyl, tricosyl and tetracosyl; alkenyl groups, such as propenyl, isopropenyl, butenyl, butadienyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl (oleyl), nonadecenyl, icosenyl, heneicosenyl, docosenyl, tricosenyl and tetracosenyl; cycloalkyl groups, such as cyclopentyl, cyclohexyl and cycloheptyl; alkylcycloalkyl groups, such as methylcyclopentyl, dimethylcyclopentyl, ethylcyclopentyl, propylcyclopentyl, ethylmethylcyclopentyl, trimethylcyclopentyl, diethylcyclopentyl, ethyldimethylcyclopentyl, propylmethylcyclopentyl, propylethylcyclopentyl, di-propylcyclopentyl, propylethylmethylcyclopentyl, methylcyclohexyl, dimethylcyclohexyl, ethyl- cyclohexyl, propylcyclohexyl, ethylmethylcyclohexyl, trimethylcyclohexyl, diethylcyclohexyl, ethyldimethylcyclohexyl, propylmethylcyclohexyl, propylethylcyclohexyl, dipropylcyclohexyl, propylethylmethylcyclohexyl, methylcycloheptyl, dimethylcycloheptyl, ethylcycloheptyl, propylcycloheptyl, ethylmethylcycloheptyl, trimethylcycloheptyl, diethylcycloheptyl, ethyldimethylcycloheptyl, propylmethylcycloheptyl, propylethylcycloheptyl, di-propylcycloheptyl and propylethylmethylcycloheptyl; aryl groups, such as phenyl and naphthyl; alkylaryl groups, such as tolyl, xylyl, ethylphenyl, propylphenyl, ethylmethylphenyl, trimethylphenyl, butylphenyl, propylmethylphenyl, diethylphenyl, ethyldimethylphenyl, tetramethylphenyl, pentylphenyl, hexylphenyl, heptylphenyl, octylphenyl, nonylphenyl, decylphenyl, undecylphenyl and dodecylphenyl; and arylalkyl groups, such as benzyl, methylbenzyl, dimethylbenzyl, phenethyl, methylphenethyl and dimethylphenethyl. The above hydrocarbon groups include all possible isomers.

Specific examples of the zinc dithiophosphate usable in the present invention include zinc diisopropyldithiophosphate, zinc diisobutyldithiophosphate, zinc di-sec-butyldithiophosphate, zinc di-sec-pentyldithiophosphate, zinc di-n-hexyldithiophosphate, zinc di-sec-hexyldithiophosphate, zinc di-octyldithiophosphate, zinc di-2-ethylhexyldithiophosphate, zinc di-n-decyldithiophosphate, zinc di-n-dodecyldithiophosphate, zinc diisotridecyldithiophosphate and mixtures thereof.

The amount of the zinc dithiophosphate added in the lubricant is not particularly restricted. The zinc dithiophosphate is preferably contained in an amount of 0.1% or less, more preferably in an amount of 0.06% or less, most preferably in a minimum effective amount, in terms of the phosphorus element based on the total mass of the lubricant in order to produce a higher friction reducing effect. When the amount of the zinc dithiophosphate exceeds 0.1%, there arises a possibility of inhibiting the effect of the ashless fatty-ester friction modifier and/or the ashless aliphatic-amine friction modifier.

The zinc dithiophosphate can be prepared by any known method. For example, the zinc dithiophosphate may be prepared by reacting alcohols or phenols having the above $R^4$, $R^5$, $R^6$ and $R^7$ hydrocarbon groups with phosphorous pentasulfide to form dithiophosphoric acid, and then, neutralizing the thus-formed dithiophosphoric acid with zinc oxide. Herein, the molecular structure of zinc dithiophosphate differs according to the alcohols or phenols used as a raw material for the zinc dithiophosphate production.

The lubricant may further include any other additive or additives, such as a metallic detergent, an antioxidant, a viscosity index improver, a friction modifier other than the above-mentioned fatty-ester friction modifier and/or the aliphatic-amine friction modifier, an ashless dispersant other than the above-mentioned polybutenyl succineimide and/or the derivative thereof, an anti-wear agent or extreme-pressure additive, a rust inhibitor, a nonionic surfactant, a demulsifier, a metal deactivator and/or an anti-foaming agent, when used in an internal combustion engine. These additives may be used alone or in the form of a mixture of two or more thereof so as to meet the lubricant performance required.

The metallic detergent can be any metallic-detergent compound commonly used for a lubricant. Specific examples of the metallic detergent usable in the present invention include sulfonates, phenates and salicylates of alkali metals or alkali-earth metals; and mixtures of two or more thereof. Examples of the alkali metals include sodium (Na) and potassium (K), and examples of the alkali-earth metals include calcium (Ca) and magnesium (Mg). In the present invention, sodium and calcium sulfonates, sodium and calcium phenates, and sodium and calcium salicylates are suitably used. The total base number and amount of the metallic detergent can be selected in accordance with the lubricant performance required. The total base number of the metallic detergent is usually 0 to 500 mgKOH/g, preferably 150 to 400 mgKOH/g, as measured by perchloric acid method according to ISO 3771 "Determination of base number—Perchloric acid potentiometric titration method". The amount of the metallic detergent is usually 0.1 to 10% based on the total mass of the lubricant.

The antioxidant can be any antioxidant compound commonly used for a lubricant. Specific examples of the antioxidant usable in the present invention include: phenolic antioxidants, such as 4,4'-methylenebis(2,6-di-tert-butylphenol) and octyl-3-(3,5-di-tert-butyl-4-hydroxyphenyl)propionate; amino antioxidants, such as phenyl-$\alpha$-naphthylamine, alkylphenyl-$\alpha$-naphthylamine and alkyldiphenylamine; and mixtures of two or more thereof. The amount of the antioxidant is usually 0.01 to 5% based on the total mass of the lubricant.

The viscosity index improver can be exemplified by: non-dispersion type viscosity index improvers, such as methacrylic acids, copolymers of methacrylic acids and hydrides thereof; and dispersion type viscosity index improvers, such as copolymers of methacrylates (including nitrogen compounds). There may be also used, as the viscosity index improver, copolymers of ethylene and $\alpha$-olefins (such as propylene, 1-butene and 1-pentene) and hydrides thereof, polyisobutylenes and hydrides thereof, a hydrogenated copolymer of styrene and diene, a copolymer of styrene and maleic anhydride and polyalkylstyrenes. The molecular weight of the viscosity index improver needs to be selected in view of shear stability. For example, the number-average molecular weight of the viscosity index improver is desirably in a range of 5,000 to 1,000,000, more desirably 100,000 to 800,000, for dispersion or non-dispersion type polymethacrylates; in a range of 800 to 5,000 for polyisobutylenes and hydrides thereof; and in a range of 800 to 300,000, more desirably 10,000 to 200,000 for ethylene/$\alpha$-olefin copolymers and hydrides thereof. The above viscosity index improving compounds can be used alone or in the form of a mixture of two or more thereof. The amount of the viscosity index improver is preferably 0.1 to 40.0% based on the total mass of the lubricant.

The friction modifier other than the above-mentioned fatty-ester friction modifier and/or the aliphatic-amine friction modifier can be exemplified by ashless friction modifiers, such as boric acid esters, higher alcohols and aliphatic ethers, and metallic friction modifiers, such as molybdenum dithiophosphate, molybdenum dithiocarbamate and molybdenum disulfide.

The ashless dispersant other than the above-mentioned polybutenyl succinimide and/or the derivative thereof can be exemplified by polybutenylbenzylamines and polybutenylamines each having polybutenyl groups of number-average molecular weight of 900 to 3,500, polybutenyl succinimides having polybutenyl groups of number-average molecular weight of less than 900 and derivatives thereof.

The anti-friction agent or extreme-pressure additive can be exemplified by disulfides, sulfurized fats and oils, olefin sulfides, phosphate esters having one to three $C_2$-$C_{20}$ hydrocarbon groups, thiophosphate esters, phosphite esters, thiophosphite esters and amine salts of these esters.

The rust inhibitor can be exemplified by alkylbenzene sulfonates, dinonylnaphthalene sulfonates, esters of alkenylsuccinic acids and esters of polyalcohols.

The nonionic surfactant and the demulsifier can be exemplified by noionic polyalkylene glycol surfactants, such as polyoxyethylene alkylethers, polyoxyethylene alkylphenylethers and polyoxyethylene alkylnaphthyleters.

The metal deactivator can be exemplified by imidazoline compounds, pyrimidine derivatives, thiazole and benzotriazole.

The anti-foaming agent can be exemplified by silicones, fluorosilicones and fluoroalkylethers.

Each of the friction modifier other than the fatty-ester friction modifier and/or the aliphatic-amine friction modifier, the ashless dispersant other than the polybutenyl succinimide and/or the derivative thereof, the anti-wear agent or extreme-pressure additive, the rust inhibitor and the demulsifier is usually contained in an amount of 0.01 to 5% based on the total mass of the lubricant, and the metal deactivator is contained in an amount of 0.0005 to 1% based on the total mass of the lubricant.

With the above-described structure, the sliding mechanism is capable of attaining excellent low-friction characteristics and high abrasion resistance to be fit for a variety of uses, especially useful for an internal combustion engine, a hard disk drive and a drive train. The sliding mechanism can be also used as a sliding gear of an industrial machine.

The present invention will be described in more detail by reference to the following examples. However, it should be noted that the following examples are only illustrative and not intended to limit the invention thereto.

(1) Assembling of Test Units

In Examples 1 to 27 and Comparative Examples 1 to 12, abrasion test units were assembled from varying combinations of pins, discs and lubricants. Each test unit had three pins and one disc as shown in FIGURE. The pins, discs and lubricants used were prepared as follows, and the detailed specifications of the test units are indicated in TABLES 1 to 3.

(1-1) Preparation of Pins

A high-carbon chromium material "SUJ2" (i.e. an iron-based material in compliance with JIS G4805) was formed into pin bases by grinding and subjected to spheroidizing at 780° C., water quenching at 30° C. and tempering at 150° C. The heat-treated pin bases were lapped with lapping tapes in such a manner as to form their respective base surfaces with different surface roughness (Ra$\leq$0.2 μm). Then, coatings were applied to the surfaces of the pin bases. The coatings were formed with different thickness by chemical vapor deposition (CVD) or physical vapor deposition (PVD) using the following coating material together with graphite targets.
  [Coating Materials]
  DLC: a-C (treated by PVD), a-C:H (treated by CVD)
  TiN (treated by PVD)
  CrN (treated by PVD)
Finally, the coatings were lapped with lapping tapes in such a manner as to form their sliding surfaces with different surface thickness (Ra$\leq$0.1 μm). Each of the pins had a diameter of 5 mm and a length of 5 mm.

(1-2) Preparation of Aluminum-alloy Discs

Discs of aluminum-based alloys, such as AC2A, AC8A, ADC12 and ADC14, were heat-treated under the following conditions.
  [Heat Treatment]
  AC2A: subjected to age hardening at 510° C. for 8 hours, water quenching at 160° C. for 9 hours and air cooling.
  AC8A: subjected to age hardening at 200° C. for 4 hours and air cooling.
  ADC12, ADC14: no heat treatment.
Then, the aluminum-alloy discs were subjected to lapping to form their respective sliding surfaces with different surface roughness.

(1-3) Preparation of Magnesium-alloy Discs

Discs of magnesium-based alloys, such as AZ91D, AE42, AS21, AX51, AJ52, QE22-T6 and WE43-T6, were heat-treated under the following conditions.

[Heat Treatment]
QE22-T6: subjected to age hardening at 525° C. for 4 hours, water quenching at 200° C. for 8 hours and air cooling.
WE43-T6: subjected to age hardening at 525° C. for 4 hours, water quenching at 250° C. for 16 hours and air cooling.
AZ91D, AE42, AS21, AX51, AJ52: no heat treatment.

Then, the magnesium-alloy discs were subjected to lapping to form their respective sliding surfaces with different surface roughness.

(1-4) Preparation of DLC Discs

A high-carbon chromium material "SUJ2" (i.e. an iron-based material in compliance with JIS G4805) was formed into disc bases by grinding and subjected to spheroidizing at 780° C., water quenching at 30° C., and tempering at 150° C. The heat-treated disc bases were lapped in such a manner as to form their respective base surfaces with different surface roughness. Then, DLC coatings were applied to the surfaces of the disc bases. The DLC coatings were formed by chemical vapor deposition (CVD) or physical vapor deposition (PVD) using the following DLC coating material together with graphite targets.

[Coating Materials]
DLC: a-C (treated by PVD), a-C:H (treated by CVD)
The DLC coatings were lapped with lapping tapes in such a manner as to form their sliding surfaces with different surface roughness (Ra≦0.1 μm).

(1-5) Preparation of Lubricants

Each of lubricants A to I was prepared by mixing a base oil with a friction modifier or modifiers, an ashless dispersant, zinc dialkyldithiophospate, a metallic detergent and other additives. The compositions and properties of the thus-prepared lubricants A to I are shown in TABLE 4. In TABLE 4, the amount of each oil compound is indicated based on the total mass of the base oil, and the amount of each additive is indicated based on the total mass of the lubricant.

(2) Abrasion Test

The test units of Examples 1 to 27 and Comparative Examples 1 to 12 were subjected to abrasion test under the following test conditions. The test results are shown in TABLES 1 to 3.

[Test Condition]
Maximum Hertz's pressure: 80 MPa
Disc rotation speed: 30 rpm
Lubrication method: Oil bath
Lubricant temperature: 80° C.
Test time: 60 minutes

TABLE 1

| | Pin | | | | | Disc | | | | |
|---|---|---|---|---|---|---|---|---|---|---|
| | | Coating | | | | | | | | |
| | Base Material | Material | Thickness (μm) | Surface roughness (μm) | Surface hardness (Hv) | Material | Surface roughness (μm) | Surface hardness ($H_B$) | Lubricant | Friction coefficient |
| Example 1 | SUJ2 | a-C | 1.1 | 0.03 | 1850 | AC2A | 0.05 | 80 | A | 0.055 |
| Example 2 | SUJ2 | a-C | 1.5 | 0.03 | 1850 | AC8A | 0.05 | 120 | B | 0.057 |
| Example 3 | SUJ2 | a-C | 1.4 | 0.03 | 1850 | ADC12 | 0.05 | 110 | C | 0.061 |
| Example 4 | SUJ2 | a-C | 0.8 | 0.03 | 1850 | ADC14 | 0.05 | 130 | D | 0.066 |
| Example 5 | SUJ2 | a-C: H | 0.7 | 0.02 | 1250 | AC8A | 0.04 | 120 | A | 0.083 |
| Example 6 | SUJ2 | a-C | 2.0 | 0.02 | 1000 | AC2A | 0.03 | 80 | B | 0.060 |
| Example 7 | SUJ2 | a-C | 1.1 | 0.03 | 1850 | AC8A | 0.10 | 120 | E | 0.068 |
| Example 8 | SUJ2 | a-C | 0.9 | 0.10 | 1850 | AC8A | 0.05 | 120 | F | 0.066 |
| Example 9 | SUJ2 | a-C | 0.3 | 0.04 | 3500 | ADC14 | 0.05 | 130 | G | 0.070 |
| Comparative Example 1 | SUJ2 | none | — | 0.03 | 1850 | AC2A | 0.10 | 80 | H | 0.14 |
| Comparative Example 2 | SUJ2 | none | — | 0.03 | 1850 | AC8A | 0.05 | 120 | E | 0.12 |
| Comparative Example 3 | SUJ2 | a-C | 1.2 | 0.03 | 1850 | ADC14 | 0.05 | 130 | I | 0.10 |
| Comparative Example 4 | SUJ2 | TiN | 2.5 | 0.04 | 2300 | AC2A | 0.05 | 80 | E | 0.11 |
| Comparative Example 5 | SUJ2 | CrN | 2.6 | 0.03 | 1700 | AC8A | 0.05 | 120 | E | 0.11 |

TABLE 2

| | Pin | | | | | Disc | | | | |
|---|---|---|---|---|---|---|---|---|---|---|
| | | Coating | | | | | | | | |
| | Base Material | Material | Thickness (μm) | Surface roughness (μm) | Surface hardness (Hv) | Material | Surface roughness (μm) | Surface hardness ($H_B$) | Lubricant | Friction coefficient |
| Example 10 | SUJ2 | a-C | 1.2 | 0.03 | 1850 | AZ91D | 0.04 | 65 | A | 0.056 |
| Example 11 | SUJ2 | a-C | 1.4 | 0.04 | 1850 | AE42 | 0.06 | 60 | B | 0.049 |
| Example 12 | SUJ2 | a-C | 1.3 | 0.04 | 1850 | AS21 | 0.05 | 55 | C | 0.062 |

TABLE 2-continued

| | Pin | | | | Disc | | | | |
|---|---|---|---|---|---|---|---|---|---|
| | | Coating | | | | | | | |
| | Base Material | Material | Thickness (μm) | Surface roughness (μm) | Surface hardness (Hv) | Material | Surface roughness (μm) | Surface hardness ($H_B$) | Lubricant | Friction coefficient |
| Example 13 | SUJ2 | a-C | 0.9 | 0.03 | 1850 | AS21 | 0.04 | 55 | D | 0.069 |
| Example 14 | SUJ2 | a-C:H | 0.7 | 0.03 | 1250 | AE42 | 0.05 | 60 | A | 0.086 |
| Example 15 | SUJ2 | a-C | 1.9 | 0.02 | 1000 | AX51 | 0.05 | 57 | B | 0.058 |
| Example 16 | SUJ2 | a-C | 1.0 | 0.02 | 1850 | AJ52 | 0.08 | 63 | E | 0.060 |
| Example 17 | SUJ2 | a-C | 0.8 | 0.09 | 1850 | QE22-T6 | 0.06 | 65 | F | 0.071 |
| Example 18 | SUJ2 | a-C | 0.4 | 0.03 | 3500 | WE43-T6 | 0.06 | 75 | G | 0.066 |
| Comparative Example 6 | SUJ2 | none | — | 0.04 | 750 | AZ91D | 0.10 | 65 | H | 0.13 |
| Comparative Example 7 | SUJ2 | none | — | 0.03 | 750 | AE42 | 0.04 | 60 | E | 0.12 |
| Comparative Example 8 | SUJ2 | a-C | 1.2 | 0.04 | 1850 | AS21 | 0.04 | 55 | I | 0.096 |
| Comparative Example 9 | SUJ2 | TiN | 2.4 | 0.04 | 2300 | AZ91D | 0.06 | 65 | E | 0.11 |
| Comparative Example 10 | SUJ2 | CrN | 2.7 | 0.03 | 1700 | AE42 | 0.05 | 60 | E | 0.10 |

TABLE 3

| | Pin | | | | | Disc | | | | | | |
|---|---|---|---|---|---|---|---|---|---|---|---|---|
| | | Coating | | | | | Coating | | | | | |
| | Base Material | Material | Thickness (μm) | Surface roughness (μm) | Surface hardness (Hv) | Base Material | Material | Thickness (μm) | Surface roughness (μm) | Surface hardness (Hv) | Lubricant | Friction coefficient |
| Example 19 | SUJ2 | a-C | 1.1 | 0.03 | 1850 | SUJ2 | a-C | 1.1 | 0.04 | 1800 | A | 0.031 |
| Example 20 | SUJ2 | a-C | 1.5 | 0.03 | 1850 | SUJ2 | a-C:H | 1.1 | 0.03 | 1800 | B | 0.046 |
| Example 21 | SUJ2 | a-C:H | 1.4 | 0.03 | 1250 | SUJ2 | a-C | 1.9 | 0.05 | 1550 | C | 0.045 |
| Example 22 | SUJ2 | a-C | 0.8 | 0.03 | 1850 | SUJ2 | a-C | 0.8 | 0.05 | 1800 | D | 0.033 |
| Example 23 | SUJ2 | a-C:H | 1.8 | 0.02 | 1250 | SUJ2 | a-C:H | 1.9 | 0.04 | 1200 | A | 0.060 |
| Example 24 | SUJ2 | a-C | 2.0 | 0.02 | 1000 | SUJ2 | a-C | 2.0 | 0.03 | 1200 | B | 0.032 |
| Example 25 | SUJ2 | a-C | 1.1 | 0.03 | 1850 | SUJ2 | a-C | 1.1 | 0.10 | 1800 | E | 0.037 |
| Example 26 | SUJ2 | a-C | 0.9 | 0.10 | 1850 | SUJ2 | a-C | 0.8 | 0.05 | 1800 | F | 0.035 |
| Example 27 | SUJ2 | a-C | 0.3 | 0.04 | 3500 | SUJ2 | a-C | 0.3 | 0.05 | 2500 | G | 0.041 |
| Comparative Example 11 | SUJ2 | none | — | 0.03 | 750 | AC2A | none | — | 0.10 | 80 | H | 0.140 |
| Comparative Example 12 | SUJ2 | a-C | 0.8 | 0.03 | 1850 | SUJ2 | a-C | 0.8 | 0.05 | 1800 | I | 0.080 |

TABLE 4

| | Lubricant | | A | B | C | D | E | F | G | H | I |
|---|---|---|---|---|---|---|---|---|---|---|---|
| Base oil | Mineral oil [1] | mass % | 100 | 100 | — | 100 | 100 | 100 | 100 | 100 | 100 |
| | Synthetic oil [2] | mass % | — | — | 100 | — | — | — | — | — | — |
| Additives | Fatty-ester friction modifier [3] | mass % | 1.0 | 1.0 | 1.0 | — | 1.0 | 1.0 | 0.2 | — | — |
| | Aliphatic-amine friction modifier [4] | mass % | — | — | — | 1.0 | — | 0.5 | — | — | — |
| | Organomolybdenum compound [5] | mass % | — | — | — | — | — | — | — | — | 1.1 |
| | Ashless dispersant [6] | mass % | 5.0 | 5.0 | 5.0 | 5.0 | 5.0 | 5.0 | 5.0 | 5.0 | 5.0 |
| | ZDTP [7] (in terms of phosphorus element) | mass % | — | 0.047 | 0.047 | 0.047 | 0.094 | 0.094 | 0.047 | 0.094 | 0.094 |
| | Metallic detergent (in terms of metal element) | mass % | 0.15 | 0.15 | 0.15 | 0.15 | 0.15 | 0.15 | 0.15 | 0.15 | 0.15 |
| | Calcium sulfonate [8] | mass % | 0.5 | 0.5 | 0.5 | 0.5 | 0.5 | 0.5 | 0.5 | 0.5 | 0.5 |
| | Calcium phenate [9] | mass % | 0.9 | 0.9 | 0.9 | 0.9 | 0.9 | 0.9 | 0.9 | 0.9 | 0.9 |
| | Others [10] | mass % | 7.0 | 7.0 | 7.0 | 7.0 | 7.0 | 7.0 | 7.0 | 7.0 | 7.0 |
| Properties | Kinematic viscosity at 100° C. | mm$^2$/s | 10.3 | 10.2 | 10.0 | 10.2 | 10.3 | 10.3 | 10.3 | 10.3 | 10.2 |
| | Total base number according to perchloric acid method | mgKOH/g | 6.2 | 6.2 | 6.2 | 6.2 | 6.5 | 6.5 | 6.5 | 6.5 | 7.5 |

TABLE 4-continued

| Lubricant | | A | B | C | D | E | F | G | H | I |
|---|---|---|---|---|---|---|---|---|---|---|
| Total base number according to hydrochloric method | mgKOH/g | 4.5 | 4.5 | 4.5 | 4.5 | 5.2 | 5.2 | 5.2 | 5.2 | 6.0 |

[Remarks]
[1] Hydrocracked mineral oil (kinematic viscosity at 100° C.: 5.0 mm$^2$/s, viscosity index: 120, aromatic content: 5.5 mass %)
[2] 1-Decene oligomer hydride (kinematic viscosity at 100° C.: 3.9 mm$^2$/s, viscosity index: 124, aromatic content: 0.0 mass %)
[3] Glycerol monolate
[4] N,N-dipolyoxyethylene-N-oleylamine
[5] Molybdenum dithiocarbamate (molybdenum content: 4.1 mass %)
[6] Polybutenyl succinimide (nitrogen content: 1.2 mass %)
[7] Zinc dialkyldithiophosphate (zinc content: 9.3 mass %, phosphrous content: 8.5 mass %, alkyl group: secondary butyl or hexyl group)
[8] Calcium sulfonate (total base number: 300 mgKOH/g, calcium content: 12.0 mass %)
[9] Calcium phenate (total base number: 255 mgKOH/g, calcium content: 9.2 mass %)
[10] Including viscosity index improver, antioxidant, rust inhibitor, demulsifier, nonionic surfactanct, metal deactivator and anti-foaming agent As seen in TABLES 1 to 3, the test units of Examples 1 to 27 showed more excellent low-friction characteristics and higher abrasion resistance than those of Comparative Examples 1 to 12.

The test units of Examples 1 to 9 were comprised of the DLC-coated pins, the aluminum-alloy discs and any of the lubricants A to G containing at least one of the ashless fatty-ester friction modifier and/or the ashless aliphatic-amine friction modifier, respectively. In comparison to the test unit of Comparative Example 1, the friction coefficients of the test units of Examples 1 to 9 were reduced by about 40 to 60%. Similarly, the test units of Examples 10 to 18 were comprised of the DLC-coated pins, the magnesium-alloy discs and any of the lubricants A to G; respectively. The friction coefficients of the test units of Examples 10 to 18 were also reduced by about 40 to 60% in comparison to the test unit of Comparative Example 6. The test units of Examples 19 to 27 were comprised of the DLC-coated pins, the DLC-coated discs and any of the lubricants A to G, respectively. The friction coefficients of the test units of Examples 19 to 17 were reduced by about 50 to 70% in comparison to the test unit of Comparative Example 11. In addition, any deterioration in surface appearance was not seen in the sliding members of Examples 1 to 27 even after the abrasion test.

Furthermore, the friction reducing effect became more pronounced as the amount of zinc dithiophosphate contained in the lubricant was decreased.

Among the DLC coatings, the a-C coating on the sliding surface was more effective in reducing friction than the a-C:H coating. In the case of both the discs and the pins being DLC coated as shown in Examples 19 to 27, the combination of the a-C coatings on the sliding surfaces was more effective than the combination of the a-C coating and the a-C:H coating, and the combination of the a-C coating, and the a-C:H coating was more effective than the combination of the a-C:H coatings.

On the other hand, the test unit of Comparative Example 1 was comprised of the pins with no DLC coatings, the aluminum-alloy disc and the lubricant H containing neither of the ashless fatty-ester and aliphatic amine friction modifiers. The test unit of Comparative Example 6 was comprised of the pins with no DLC coatings, the magnesium-alloy disc and the lubricant H. Further, the test unit of Comparative Examples 11 was assembled from the pins with no DLC coatings, the aluminum-alloy disc with no DLC coating and the lubricant H. The friction coefficients of the test units of Comparative Examples 1, 6 and 11 exceeded 0.1 to be much higher than those of Examples 1 to 27. The test units of Comparative Examples 2 and 7 were structurally similar to that of Comparative Examples 1 and 6, and had the pins with no DLC coatings, the SUJ2 discs with no DLC coatings and the lubricant E containing the ashless fatty-ester friction modifier, respectively. The friction coefficients of Comparative Examples 2 and 7 were slightly lower than those of Comparative Examples 1 and 6 but still exceeded 0.1. It is estimated that, in the test units of Comparative Examples 1, 2, 6, 7 and 11, reaction films were formed predominantly of zinc dithiophosphate (ZnDTP) on the sliding surfaces of the pins and discs to thereby cause increases in the friction coefficients. The test unit of Comparative Example 3 was comprised of the pins with the DLC coatings, the aluminum-alloy disc and the lubricant I. The test unit of Comparative Example 8 was comprised of the pins with the DLC coatings, the magnesium-alloy disc and the lubricant I. The test unit of Comparative Example 12 was comprised of the pins with the DLC coatings, the disc with the DLC coating and the lubricant I. In the lubricant I, the organomolybdenum compound was added in place of the ashless fatty-ester and/or aliphatic-amine friction modifier. The friction coefficients of the test units of Comparative Examples 3, 8 and 12 were thus nearly 0.1. It is thought that molybdenum disulfide films were not formed from the lubricant I in the test units of Comparative Examples 3, 8 and 12, thereby failing to obtain a sufficient friction reducing effect. The test units of Comparative Examples 4 and 9 had the pins with the TiN coatings, and the test units of Comparative Examples 5 and 10 had the pins with the CrN coatings. The friction coefficients of the test units of Comparative Examples 4, 5, 9 and 10 were slightly lowered by the use of the lubricant E, but stood at nearly 0.1. There was little difference between the friction coefficients of the test units Comparative Examples 4 and 5 and between the friction coefficients of the test units of Comparative Examples 9 and 10.

As described above, the sliding mechanism according to one exemplary embodiment of the present invention can attain world-class low-friction characteristics and high abrasion resistance and is therefore industrially useful. When the sliding mechanism is used in an internal combustion engine, it becomes possible to reduce friction loss dramatically so as to provide more improvement in vehicle fuel efficiency than ever before.

Although the present invention has been described with reference to a specific embodiment of the invention, the invention is not limited to the above-described embodiment. Various modifications and variations of the embodiment described above will occur to those skilled in the art in light of the above teaching. The scope of the invention is defined with reference to the following claims.

What is claimed is:

1. A low-friction sliding mechanism, comprising:
a first sliding member having a sliding surface, at least the sliding surface of the first sliding member comprising a diamond-like carbon material;
a second sliding member having a sliding surface slidable relative to the sliding surface of the first sliding member, the second sliding member being formed in one piece of diamond-like carbon material; and
a lubricant applied to the sliding surfaces of the first and second sliding members, the lubricant comprising at least one of an ashless fatty-ester friction modifier and an ashless aliphatic-amine friction modifier.

2. A low-friction sliding mechanism according to claim 1, wherein the diamond-like carbon material of the first sliding member is hydrogen-free amorphous carbon.

3. A low-friction sliding mechanism according to claim 1, wherein the aluminum-based alloy material of the second sliding member is a hypoeutectic or hypereutectic aluminum alloy containing 4 to 20% by mass silicon and 1.0 to 5.0% by mass copper.

4. A low-friction sliding mechanism according to claim 1, wherein the magnesium-based alloy material of the second sliding member comprises at least one alloy selected from the group consisting of magnesium-aluminum- zinc alloys, magnesium-aluminum-rare earth metal alloys, magnesium- aluminum-calcium alloys, magnesium-zinc-aluminum-calcium alloys, magnesium-aluminum-calcium-rare earth metal alloys, magnesium-aluminum- strontium alloys, magnesium-aluminum-silicon alloys, magnesium-rare earth metal-zinc alloys, magnesium-silver-rare earth metal alloys and magnesium-yttrium-rare earth metal alloys.

5. A low-friction sliding mechanism according to claim 1, wherein each of the sliding surfaces of the first and second sliding member has an arithmetic mean roughness of 0.1 μm or less.

6. A low-friction sliding mechanism according to claim 1, wherein the first sliding member comprises a base and a coating of the diamond-like carbon material applied to the base to define the sliding surface, the coating has a thickness of 0.3 to 2.0 μm and a micro Vickers hardness HV of 1000 to 3500 as measured by application of a 10 g load, the second sliding member is made of the aluminum-based alloy material, and the sliding surface of the second sliding member has a Brinell hardness HB of 80 to 130.

7. A low-friction sliding mechanism according to claim 1, wherein the first sliding member comprises a base and a coating of the diamond-like carbon material applied to the base to define the sliding surface, the coating has a thickness of 0.3 to 2.0 μm and a micro Vickers hardness HV of 1000 to 3500 as measured by application of a 10 g load, the second sliding member comprises an magnesium-based alloy material, and the sliding surface of the second sliding member has a Brinell hardness HB of 45 to 95.

8. An internal combustion engine comprising a low-friction sliding mechanism according to claim 1.

9. A low-friction sliding mechanism according to claim 1, wherein the fatty-ester friction modifier and the aliphatic-amine friction modifier comprise C6-C30 straight or branched hydrocarbon chains, respectively, and the lubricant comprises 0.05 to 3.0% by mass based on the total mass of the lubricant of the at least one of the fatty-ester friction modifier and the aliphatic-amine friction modifier.

10. A low-friction sliding mechanism according to claim 1, wherein the lubricant further comprises polybutenyl succinimide and/or a derivative thereof.

11. A low-friction sliding mechanism according to claim 10, wherein the lubricant comprises 0.1 to 15% by mass based on the total mass of the lubricant of the polybutenyl succinimide and/or the derivative.

12. A low-friction sliding mechanism according to claim 1, wherein the lubricant further comprises zinc dithiophosphate in an amount of 0.1% or less by mass in terms of an phosphorus element based on a total mass of the lubricant.

13. A low-friction sliding mechanism, comprising:
a first sliding member having a sliding surface, at least the sliding surface of the first sliding member comprising a diamond-like carbon material wherein the diamond-like carbon material of the first sliding member is hydrogen-free amorphous carbon;
a second sliding member having a sliding surface slidable relative to the sliding surface of the first sliding member, the second sliding member consisting essentially of a diamond-like carbon material; and
a lubricant applied to the sliding surfaces of the first and second sliding members, the lubricant comprising friction modifier.

* * * * *